(12) United States Patent
Bourgerie et al.

(10) Patent No.: US 12,375,260 B2
(45) Date of Patent: Jul. 29, 2025

(54) OPTIMIZING ENCRYPTED COMPUTATION PARAMETERS

(71) Applicant: ZAMA SAS, Paris (FR)

(72) Inventors: Quentin Bourgerie, Paris (FR); Damien Ligier, Paris (FR); Samuel Jacques Jean Tap, Paris (FR)

(73) Assignee: ZAMA SAS, Paris (FR)

(*) Notice: Subject to any disclaimer, the term of this patent is extended or adjusted under 35 U.S.C. 154(b) by 0 days.

(21) Appl. No.: 18/866,178

(22) PCT Filed: May 17, 2023

(86) PCT No.: PCT/EP2023/063315
§ 371 (c)(1),
(2) Date: Nov. 15, 2024

(87) PCT Pub. No.: WO2023/222792
PCT Pub. Date: Nov. 23, 2023

(65) Prior Publication Data
US 2025/0175322 A1    May 29, 2025

(30) Foreign Application Priority Data

May 19, 2022 (EP) ..................................... 22290035

(51) Int. Cl.
*G06F 9/00* (2018.01)
*H04L 9/00* (2022.01)
(Continued)

(52) U.S. Cl.
CPC ............. *H04L 9/0618* (2013.01); *H04L 9/008* (2013.01); *H04L 9/40* (2022.05); *G06F 9/4401* (2013.01)

(58) Field of Classification Search
CPC .......... H04L 9/0618; H04L 9/008; H04L 9/40
(Continued)

(56) References Cited

U.S. PATENT DOCUMENTS 11,177,935 B2    11/2021   Musuvathi et al.
11,277,258 B1 *   3/2022   Zhang .................. G06V 40/161
(Continued)

FOREIGN PATENT DOCUMENTS

| CN | 105122721 | 12/2015 |
| CN | 113553610 | 10/2021 |
| WO | WO 2022/090407 | 5/2022 |

OTHER PUBLICATIONS

International Search Report and Written Opinion of the ISA for PCT/EP2023/063315, mailed Aug. 2, 2023, 14 pages.
(Continued)

*Primary Examiner* — Volvick Derose
(74) *Attorney, Agent, or Firm* — Nixon & Vanderhye P.C.

(57) ABSTRACT

Some embodiments are directed to a computer-implemented method of determining encrypted computation parameters for carrying out an encrypted computation on noisy ciphertexts. A computation graph is divided into multiple subgraphs, defined by a type and by instantiation parameters for the type. Respective sets of encrypted computation parameters are defined for the respective types. An optimization of the encrypted computation parameters is performed to minimize a computational cost of carrying out the encrypted computation according to the encrypted computation parameters. The encrypted computation parameters are constrained to satisfy a noise constraint on ciphertext noise while carrying out the encrypted computation. The noise constraint is based on respective noise constraints for respective subgraphs, defined by a noise constraint function for the type that takes at least the encrypted computation parameters for the type and the instantiation parameters of the subgraph as input.

13 Claims, 9 Drawing Sheets

(51) Int. Cl.
  *H04L 9/06* (2006.01)
  *H04L 9/40* (2022.01)
  *G06F 9/4401* (2018.01)
(58) Field of Classification Search
  USPC .......................................................... 713/2
  See application file for complete search history.

(56) References Cited

U.S. PATENT DOCUMENTS

| | | | |
|---|---|---|---|
| 2010/0014657 A1* | 1/2010 | Kerschbaum | H04L 9/008 380/28 |
| 2013/0170640 A1 | 7/2013 | Gentry | |
| 2018/0167197 A1* | 6/2018 | Anderson | H04L 9/002 |
| 2018/0375640 A1* | 12/2018 | Laine | H04L 9/008 |
| 2020/0076570 A1 | 3/2020 | Musuvathi et al. | |
| 2021/0397988 A1* | 12/2021 | Sarpatwar | G06N 3/04 |
| 2024/0185191 A1* | 6/2024 | Bernardi | H04L 9/50 |
| 2025/0055671 A1* | 2/2025 | Soriente | H04L 9/008 |

OTHER PUBLICATIONS

International Preliminary Report on Patentability for PCT/EP2023/063315, dated Aug. 9, 2024, 14 pages.
Paindavoine Marie et al., "Minimizing the No. of Bootstrappings in Fully Homomorphic Encryption", Mar. 18, 2016, SAT 2015 18th International Conference, Austin, TX, USA, Sep. 24-27, 2015, 19 pages.
Crockett Eric Ecrockett et al., "Alchemy: A Language and Compiler for Homomorphic Encryption Made easY", Proceedings of the 2018 IEEE/ACM International Conference on Connected Health: Applications, System and Engineering Technologies, ACMPUB27, New York, NY, USA, Oct. 15, 2018, pp. 1020-1037.
Fabrice Benhamouda et al, "Optimization of Bootstrapping in Circuits", IACR, International Association for Cryptologic Research, vol. 20160818:163919, Aug. 18, 2016, pp. 1-16.
Sangeeta Chowdhary et al., "EVA Improved: Compiler and Extension Library for CKKS", Proceedings of the 14th ACM Workshop on Artificial Intelligence and Security, ACMPUB27, New York, NY, USA, Nov. 15, 2021, pp. 43-55.
Alexander Viand et al., "SoK: Fully Homomorphic Encryption Compilers", 2021 IEEE Symposium on Security and Privacy (SP), 17 pages.
Ilaria Chillotti et al., "Programmable bootstrapping enables efficient homomorphic inference of deep neural networks", Cyber Security Cryptography and Machine Learning (CSCML 2021), vol. 12716 of Lecture Notes in Computer Science, Springer, 2021, p. 1-19.

M. Albrecht et al., "On the concrete hardness of Learning with Errors", v02.1, Journal of Mathematical Cryptology, 2015, 42 pages.
M. Albrecht et al., "On the concrete hardness of Learning with Errors", v02.2, Journal of Mathematical Cryptology, 2015, 35 pages.
R. Rothblum, "Homomorphic encryption: From private-key to public-key", Theory of Cryptography (TCC 2011), vol. 6597 of Lecture Notes in Computer Science, Springer, 2011, pp. 219-234.
L. Ducas et al., "FHEW: bootstrapping homomorphic encryption in less than a second", proceedings Eurocrypt 2015, 24 pages.
I. Chillotti et al., "Faster fully homomorphic encryption: Bootstrapping in less than 0.1 seconds", proceedings Asiacrypt 2016, 31 pages.
I. Chillotti et al., "Faster packed homomorphic operations and efficient circuit bootstrapping for TFHE", proceedings Asiacrypt 2017, 31 pages.
C. Boura et al., "CHIMERA: Combining Ring-LWE-based Fully Homomorphic Encryption Schemes", J. Math. Cryptol., 2020, 23 pages.
J. Fan and F. Vercauteren, "Somewhat Practical Fully Homomorphic Encryption", Katholieke Universiteit Leuven, COSIC & IBBT, 19 pages.
Jung Hee Cheon et al., "Homomorphic Encryption for Arithmetic of Approximate Numbers", proceedings Asiacrypt 2017, 29 pages.
I. Chillotti et al., "Improved programmable bootstrapping with larger precision and efficient arithmetic circuits for TFHE", proceedings Asiacrypt 2021, 63 pages.
Z. Liu et al., "Large-precision homomorphic sign evaluation using FHEW/TFHE bootstrapping", Cryptology ePrint Archive 2021/1337, 29 pages.
M. Joye, "Balanced non-adjacent forms", proceedings Asiacrypt 2021, 18 pages.
Martin R. Albrecht et al., "On the concrete hardness of Learning with Errors", Information Security Group, Royal Holloway, University of London, Aug. 2019, 42 pages.
Hiroki Sato et al., "Speeding Up Exact Olutions to the Bootstrap and Relinearize Problems in Fully Homomorphic Encryption", DEIM Formum 2019 15-4 (EN Abstract).
First Office Action, JP Application No. 2024-568542, May 13, 2025.
Paindavoine, Marie, et al, "Minimizing the Number of Bootstrappings in Fully Homomorphic Encryption", SAC 2015, Lecture Notes in Computer Science 9566, pp. 25-43 (2016).
Lu Si-Qi et al, "Debug and Analysis on Fully Homomorphic Cryptography", Journal of Cryptologic Research, 2017, 4(1):16-28.
First Office Action, CN Application No. 2023800411491, May 28, 2025.
Search Report, CN Application No. 2023800411491, May 26, 2025.

* cited by examiner

900

950

1000

1140

OPTIMIZING ENCRYPTED COMPUTATION PARAMETERS

CROSS-REFERENCE TO RELATED APPLICATIONS

This application is the U.S. national phase of International Application No. PCT/EP2023/063315 filed May 17, 2023 which designated the U.S. and claims priority to EP 22290035.9 filed May 19, 2022, the entire contents of each of which are hereby incorporated by reference.

TECHNICAL FIELD

The presently disclosed subject matter relates to a computer-implemented method of determining encrypted computation parameters, to a corresponding device, and to a computer readable medium.

BACKGROUND

Homomorphic cryptography allows one to perform encrypted computations: computations, e.g., circuit evaluations, that are performed over encrypted data by a party without that party being able to decrypt. For example, input data and computation results may be received and returned in encrypted form. Intermediate data, e.g., an internal state of the computation, may also be in encrypted form.

Even though the result of the computation is returned in an encrypted form, when decrypted the output is expected to be the same, or very close to, as if the operations had been performed on the unencrypted data. Homomorphic encryption can be used for privacy-preserving outsourced storage and computation. This allows data to be encrypted and outsourced to a cloud environment for processing and/or storage, all while encrypted.

For example, homomorphic cryptography may be applied in fields such as health care in which privacy regulations may make it difficult to share plain data, but computations on encrypted medical data may be allowable. For example, a medical model developed, say, to classify medical data may be configured to receive medical data from a third party, say a hospital, in encrypted form. The medical model might, e.g., classify medical data, e.g., as normal or abnormal, or as having some particular medical syndrome, disease, or other disorder. Using homomorphic encryption, the medical model may be applied to medical data that is received in encrypted form. This means that the party that offers the medical model does not have access to the plain medical data that corresponds to the encrypted medical data. The user of the service can decrypt the result of the medical model application.

In particular, homomorphic cryptography techniques exist that can be used, at least in principle, to compute any function on encrypted data. Such techniques are referred to as "fully homomorphic encryption" (FHE) techniques.

Known implementations of FHE use noisy ciphertexts for security reasons. For example, encryption of a data item may comprise mapping the data item to a point in a key-dependent lattice, to which noise is added. In particular, many known implementations of FHE use LWE-type ciphertexts, whose security depends on the cryptographic hardness of the Learning With Errors problem. Such an LWE-type ciphertext may comprise one or more mask values (e.g., values modulo a certain modulus q, or torus elements), plus a body value which is derived from the mask values and from a plaintext using an encryption key, and which contains the noise. A generalization of this is a GLWE-type ciphertext, that encrypts and uses polynomials instead of scalar values. A RLWE-type ciphertext is another type of GLWE ciphertext.

When a data item has just been encrypted the noise is low—the encryption is fresh. For example, the amount of noise is so low, that if a data item were to be decrypted, the noise can be removed at some point in the decryption process, e.g., by rounding. On the other hand, the noise should be high enough to make attacks on the system sufficiently hard. For example, in the hypothetical absence of noise, many homomorphic encryption schemes could be attacked with linear algebra, or other efficient algorithms, e.g., lattice reduction algorithms. When a data item is encrypted, noise is added that is chosen so that attacks are hard while homomorphic operations can still be performed and decryption is still possible.

Most homomorphic operations increase the noise that is inherent in a homomorphically encrypted data item. When many such operations are performed, the noise may reach a level such that unique decryption is no longer possible. Generally, it is known to use a technique called bootstrapping to reduce the noise of a homomorphically encrypted value. Bootstrapping may use a public key called a bootstrapping key. By using bootstrapping to reducing noise when needed, in principle it is possible to compute any desired number of homomorphic operations.

A particular class of fully homomorphic encryption schemes are the TFHE-like homomorphic encryption schemes. Such a scheme is described in I. Chillotti et al., "Programmable bootstrapping enables efficient homomorphic inference of deep neural networks", *Cyber Security Cryptography and Machine Learning* (CSCML 2021), vol. 12716 of Lecture Notes in Computer Science, pp. 1-19, Springer, 2021 (incorporated herein by reference). TFHE-like schemes differentiate themselves from other FHE schemes by supporting a comparatively very efficient technique for bootstrapping; in addition, they enable at the same time to evaluate a function during the bootstrap operation, referred to as programmable bootstrapping. The regular bootstrapping corresponds to a programmable bootstrapping with the identity function.

Interestingly, the output of the programmable bootstrapping has an amount of noise that is independent of the noise in the input ciphertext. Thus, by performing the programmable bootstrapping, the noise in the input ciphertext can be reduced to a fixed amount, while possibly at the same time applying a function to the input ciphertext. By performing the programmable bootstrapping at appropriate times, it is possible to perform encrypted computations of unlimited multiplicative complexity.

The operation of encrypted computation techniques, and in particular TFHE-like schemes, is influenced by various encrypted computation parameters. These including various parameters of the encryption scheme itself, for example, the number of mask values and the modulus to use for LWE, as well as parameters that affect particular encrypted operations, such as the decomposition level used in the programmable bootstrapping operation.

The encrypted computation parameters need to be selected with care. In general, the parameters can affect the security of the encrypted computation (for example, the more noise is added at encryption, or the larger the number of mask values, the harder it is to break the encryption scheme); the accuracy of the outcome of the computation (for example, the polynomial size influences the number of bits of accuracy at which a computation can be carried out);

and the computational and storage requirements for carrying out the computation (for example, the decomposition level of the programmable bootstrapping and the LWE parameters affect the size of the bootstrapping key and the computational complexity of carrying out this operation).

This means that the selection of parameters involves various trade-offs. For example, to decrease the minimal noise while retaining security, some other parameters, e.g., polynomial size and/or GLWE dimension, of the encryption scheme may be increased. At the same time, the cost of various encrypted computation operators depends on the polynomial size and/or GLWE dimension, leading to a trade-off between noise and cost: it is desired to use little noise to guarantee correctness of the computation but at the same time, using little noise increases computational cost because of the need to increase other parameters.

SUMMARY

It is therefore desirable to provide automated techniques to determine suitable values for the encrypted computation parameters for carrying out a given encrypted computation.

According to one aspect of the invention, a computer-implemented method of determining encrypted computation parameters is provided, as defined by the claims. According to a further aspect, a device corresponding to the computer-implemented method is provided, as defined by the claims. According to another aspect, a computer-readable medium is provided as defined by the claims.

Various embodiments relate to performing an optimization of encrypted computation parameters for carrying out an encrypted computation on noisy ciphertexts. For examples, such parameters may include global parameters that are used throughout the encrypted computation, for example, parameters relating to the encryption scheme by which the noisy ciphertexts are encrypted, such as a polynomial size and/or GLWE dimension used.

Interestingly, the parameters may be optimized for a given computation at hand. The optimization of the cryptographic parameters may be based on a representation of the encrypted computation to be performed. The computation to be performed may be considered to correspond to a computation graph, where nodes represent operations to be performed on the encrypted data, and edges represent the inputs and outputs of the operations. For example, a node may correspond to a homomorphic linear operation, to a key switching, to a modulus switching, to a blind rotation and/or sample extraction, etcetera. Generally, respective edges may have respective effects on the security, accuracy, and/or efficiency of the encrypted computation, e.g., by incurring certain computational costs, by providing an output with a certain degree of accuracy, etcetera.

Interestingly, the inventors realized that the computation graph of an encrypted computation is in many cases made up of certain patterns that can occur multiple times throughout the encrypted computation. For example, a pattern can be that an encrypted linear map is applied to one or more inputs; followed by a key switching; followed by a modulus switching; and followed by a blind rotation and sample extraction.

The inventors envisaged to use the reoccurrence of these kinds of patterns to optimize the parameters of the encrypted computation in an efficient way. Namely, the inventors envisaged to perform the optimization based on a division of the computation graph into multiple subgraphs according to the re-occurring patterns. Accordingly, a subgraph may be defined by a type from a set of one or more types, corresponding to the pattern that the subgraph follows; and by zero or more instantiation parameters for the type. For example, continuing the above example of a subgraph with a linear map, the subgraph may be parameterized by a set of coefficients representing the linear map that is applied (or just the two-norm of the coefficients, which turns out to be sufficient information to perform the optimization in many cases).

The optimization may then be phrased in terms of this representation of the computation by types and instantiation parameters. The optimization may take into account computational cost, security, and accuracy. In particular, the optimization may minimize the computational cost while ensuring that the computation is sufficiently secure and accurate. This way, a solution may be obtained that, given requirements on security and accuracy, is most computationally efficient. The optimization can be configured to ensure that additional constraints are satisfied, for example, constraints on storage requirements related e.g. to the number of different bootstrapping or key switching keys that are used in the encrypted computation. In many cases, this is not needed however, e.g., storage requirements may be encoded by fixing them as part of the definition of the optimization problem such that it does not need to be separately ensured that they are satisfied.

Interestingly, the security and accuracy requirements may be phrased in terms of the subdivision of the computation graph into subgraphs with respective types and instantiation parameters. Namely, the optimization may constrain the encrypted computation parameters to satisfy a noise constraint on the noise of ciphertexts that are computed while carrying out the encrypted computation. This noise constraint may be defined by noise constraint functions defined for the respective types of subgraph. The noise constraint function may take as input at least the encrypted computation parameters for the given type, and the instantiation parameters of a particular subgraph. The overall noise constraint may thus comprise respective constraints for respective subgraphs, given by the noise constraint functions.

Interestingly, defining the noise constraint in terms of noise constraint functions for respective subgraph types, allows the optimization to be carried out in an efficient way. Phrasing the optimization problem in terms of subgraphs instead of individual encrypted operations, greatly reduces the size of the constraint satisfaction problem to be solved. By using a noise constraint function, moreover, the optimization problem is phrased in terms of multiple instantiations of the same constraint function that is to be satisfied. This formulation makes it easier to perform the optimization, in particular, because this makes it possible to eliminate constraints that are dominated by other constraints; either explicitly, or automatically by the used optimizer.

The noise constraint can explicitly constrain the ciphertext noise, e.g., by specifying that the noise of respective ciphertexts is below respective bounds, but also implicitly in terms of parameters of the encryption scheme used, in particular the product of the GLWE dimension and polynomial size, which as is known per se is inversely proportional to the noise at a given security level. By enforcing that the noise of respective ciphertexts is bigger than the minimum noise needed to achieve a certain security level and below the maximum noise needed to achieve a certain degree of accuracy, both security and accuracy may be ensured.

In an embodiment, it may be determined, based on the instantiation parameters of a first and second subgraph, that the noise constraint for the first subgraph is at least as strict as the noise constraint for the second subgraph. Namely, if the noise constraint for the first subgraph is satisfied for a given set of encrypted computation parameters, this may imply that the noise constraint for the second subgraph is satisfied as well. Interestingly, this may be enabled by the representation of the computation in terms of types and instantiation parameters since, for a given type, it may be determined whether the noise constraint of a first subgraph of that type is at least as strict as that of a second subgraph of that type based on the instantiation parameters. In some cases, such a determination can also be made for subgraphs of different types, as illustrated in examples given herein. In any case, determining that the noise constraint for the first subgraph is at least as strict as that of the second subgraph, enables the noise constraint for the second subgraph to be eliminated from the optimization. This allows to greatly reduce the size of the optimization problem, making it much more efficient to solve.

In an embodiment, the first and second subgraph may be parameterized by a noise bound and by a 2-norm of an applied linear map. The noise bound may correspond to a desired minimal accuracy of the encrypted values, and thereby, a maximum amount of noise. The 2-norm may be used as a parameter because the noise increase due to applying the linear map may be expressed in terms of the 2-norm.

For example, a subgraph represented by these parameters may comprise: an application of the linear map; a key switching; a modulus switching; and a blind rotation and sample extraction. This is a common pattern in encrypted computations, and, in fact, in some cases, the entire encrypted computation may be made up of instantiations of this type of subgraph.

In such a case, it is possible to determine particularly efficiently that one subgraph has a stricter noise constraint than another subgraph. Namely, this may be the case if the noise bound of the first subgraph is at most the noise bound of the second subgraph, and if the 2-norm of the first subgraph is at least the 2-norm of the second subgraph (in combination with conditions on other parameters, if any). This allows to significantly reduce the number of constraints that are needed. In particular, the noise bound may be represented by a discrete parameter. This discrete parameter may have a relatively small number of possible values, e.g., at most 10 or at most 20. In this case, for a given value of the noise bound, the subgraph with the highest 2-norm may be kept with the remaining subgraphs being eliminated. Accordingly, the number of remaining subgraphs may be equal to at most the number of possible values of the noise bound, regardless of the size of the encrypted computation. Thus, interestingly, the complexity of satisfying the noise constraint, at least for this type of subgraph, can be made independent of the size of the computation, resulting in an efficiency improvement especially for large encrypted computations.

In principle, the computational cost may be determined in various ways, for example, by performing a simulation or measurement of the actual running time of the encrypted computation.

In an embodiment, however, the computational cost may be minimized based on a cost function. Similarly to the noise constraint, also the cost function may be based on respective costs for respective subgraphs, wherein a cost for a subgraph of a given type is defined by a cost function for the given type. This cost function may take at least the encrypted computation parameters for the given type as input. The use of a cost function instead of simulations or measurements, greatly improves the efficiency of the optimization, not just because such a function may be evaluated much more efficiently than performing a simulation or measurement, but also because it allows optimization techniques to be used that rely on having a functional expression of the optimization target, such as branch-and-bound using lower and upper bounds based on the functional expression; optimization based on variable changes; or elimination of non-optimal solutions based on the arguments to the functional expression.

In particular, in an embodiment, the cost function for a given type of subgraph may be independent from the instantiation parameters for that subgraph. In other words, the computational cost for a given type of subgraph may be assumed to be independent of the instantiation parameters. In many cases, this is a reasonable approximation. For example, the noise bound for a subgraph may not affect its performance since it does not change the way the computation is carried out, whereas the linear map that is applied may only have a limited influence, e.g., may make up at most 10% or at most 1% of the computational cost of performing the encrypted computation corresponding to the subgraph. Interestingly, this approximation greatly simplifies the optimization problem because only a single instance of the cost function is needed to express the cost for the respective instantiations.

In an embodiment, a subgraph may represent a subcomputation resulting in an output ciphertext with an input-independent noise, that is, a noise that does not depend on the noise of the input ciphertexts of the subgraph, nor on the number of, e.g., linear, operations, applied to it in the subgraph. Such an output ciphertext may then be used as an input to a further subgraphs. This simplifies the optimization problem since it enables the noise constraint for a subgraph to be defined independently of the particular amount of noise of the input(s), in other words, the input noise does not need to be an instantiation parameter. In particular, all inputs to subgraphs throughout the computation, or at least subgraphs of a given type, may be assumed to have the same amount of noise. As exemplified with the use of a 2-norm and noise bound as instantiation parameters, this can particularly help to eliminate noise constraints that are less strict than other noise constraints.

In particular, the subgraph may have a final part that results in an output ciphertext with an input-independent noise: typically, a blind rotation and sample extraction, optionally followed by a rounding as discussed in more detail elsewhere. Apart from this final part, the subgraph typically does not comprise cryptographic operations that result in an input-independent noise. In particular, the noise may monotonically increase in the subgraph until the final part is reached. This again simplifies the optimization problem because it may be sufficient to determine the noise of the input to the final part, which is the largest noise during the subcomputation, and constrain this noise e.g. to provide sufficient accuracy.

In an embodiment, the encrypted computation parameters may comprise one or more of: a decomposition base of a programmable bootstrapping, a decomposition level of a programmable bootstrapping, a decomposition base of a key switching, and a decomposition level of a key switching. These parameters may be defined as global encrypted computation parameters or can be defined specifically for a given type. For these parameters, a trade-off exists in terms of the resulting noise and the efficiency at which the corresponding operation can be performed. For example, by increasing the level, the computational complexity increases but the noise decreases. Moreover, these operations form an important part of the overall computational effort of the encrypted computation. Accordingly, optimizing these parameters has a particularly significant effect on the resulting encrypted computation.

It is noted that different types of subgraph may share the same base and/or level parameters, corresponding to their use of the same key switching and/or bootstrapping keys. On the other hand, it is possible for different subgraphs to have the same structure per se in terms of cryptographic operations, but different base and/or level parameters, corresponding to performing the same operations but with different bootstrapping and/or key switching keys. Thus, by defining the types and parameters appropriately, an appropriate level of flexibility of the optimization can be achieved.

In an embodiment, a subgraph may comprise a programmable bootstrapping resulting in an output ciphertext, and a noise rounding of the output ciphertext. In other words, the ciphertext may be rounded such that it encrypts the same value but with a different noise. Interestingly, by performing noise rounding, it may be achieved that the programmable bootstrapping becomes deterministic, in particular, in the sense that it becomes independent of the particular implementation of the Fast Fourier Transform (FFT) that is used in the programmable bootstrapping.

Indeed, the inventors observed that, without rounding, at least a number of least significant bits of the ciphertext, representing the ciphertext noise, typically depend on rounding-off errors of the FFT implementation that is used. Although such rounding-off errors may not affect the security or correctness of the encrypted computation per se, it can still be desirable for the computation to be deterministic. For example, it allows to have the same encrypted computation be performed by different parties, possibly using different software and/or hardware configurations, and to check whether the resulting ciphertexts are the same, thus providing some assurance that the correct computation was performed.

In particular, in an embodiment, the encrypted computation may be performed by a miner device of a blockchain, with the rounding allowing the results of the encrypted computation as determined by multiple miner devices to be compared to each other without the need for decryption. This way, it may be enabled to reach consensus on the encrypted output of the computation and accordingly to establish that an intended encrypted computation was indeed performed.

In an embodiment, the optimization of the encrypted computation parameters may be performed by branch-and-bound. By performing a branch-and-bound, the optimization may be performed significantly more efficiently than by brute force, while at the same time, it can be ensured that the best possible values of the encrypted computation parameters are obtained.

In an embodiment, the optimization may be used to determine key switching and/or bootstrapping keys to be used for respective subgraphs. A predefined number of key switching and/or bootstrapping keys may be used. The respective keys may add respective amounts of noise, and may have respective computational costs. Adding fewer noise may be computationally more expensive, resulting in a trade-off to be made. For a given subgraph, an encrypted computation parameter may identify which of the predefined key switching and/or bootstrapping keys is to be used in the subgraph. In this way, for respective subgraphs, respective optimal choices may be made, allowing in an overall better solution than if the same key switching and/or bootstrapping keys are used in the whole encrypted computation, or if the key switching and/or bootstrapping key for a given subgraph is predefined.

Interestingly, when optimizing which key switching and/or bootstrapping key to be used for respective subgraphs, it is possible to greatly reduce the parameter space for the parameters that indicate the keys to be used. Namely, if a noise constraint for a first subgraph is at least as strict as a noise constraint for a second subgraph, the key switching and/or bootstrapping key for the first subgraph may be constrained to add at most as much noise as the key switching and/or bootstrapping key for the second subgraph. As a consequence, ordering subgraphs according to their noise constraints, the selection of key switching or bootstrapping keys may essentially correspond to a linear search in this ordered list as opposed to an independent selection for each subgraph, making the optimization problem greatly more efficient to solve.

In an embodiment, the encrypted computation parameters may indicate, for respective subgraphs in which respective linear maps are applied, a respective number of programmable bootstrappings to be performed during the application of the respective linear map. By performing a programmable bootstrapping during the application of a linear map, noise may be reduced, at the expense of incurring a significant computational cost. By making the number of bootstrappings a parameter that can be optimized for, also for this trade-off, an optimal choice can be made.

In an embodiment, when at least one programmable bootstrapping is to be performed in a linear map, it may be determined automatically how to split the linear map into multiple linear maps. As the inventors realized, this can be done by minimizing the maximal 2-norm of the respective linear maps. This is advantageous, because this minimizes the noise after the respective linear maps, making it easier to satisfy the noise constraint.

Interestingly, the inventors realized that the parameter space for the parameters that indicate the number of programmable bootstrappings to be performed, can be greatly reduced. Namely, if a noise constraint for a first subgraph is at least as strict as a noise constraint for a second subgraph, the number of programmable bootstrappings for the first subgraph may be constrained to be greater than or equal to the number of programmable bootstrappings for the second subgraph. Accordingly, sorting the subgraphs by noise constraint, the search for the optimal number of programmable bootstrappings per subgraph may essentially correspond to a linear search in this sorted lists as opposed to an independent selection per subgraph.

In an embodiment, the computation graph may be obtained by transformation of an unencrypted computation graph. For this, techniques can be used that are known per se. The transformation can directly output the computation graph of the encrypted computation such that it is already divided into the subgraphs. In an embodiment, the computation graph of the encrypted computation may be compiled into a set of instructions for an encrypted computation engine. The instructions may be according to the determined encrypted computation parameters. Accordingly, a compiler may be provided that takes as input a plain or encrypted computation, and outputs instructions for the encrypted computation engine that optimally execute the given computation. In an embodiment, an encrypted computation may be performed according to the determined encrypted computation parameters, allowing the encrypted computation to be performed in a way that combines efficiency, accuracy, and security.

In general, the encrypted computation may be performed in the TFHE setting. This means that the ciphertexts that are used to encrypt values, allow a programmable bootstrapping operation. In particular, the ciphertexts may be LWE (Learning With Errors) encryptions, that is, encryptions based on the cryptographic assumption that the Learning With Errors problem is hard. As is known per se, the programmable bootstrapping may evaluate a LWE decryption in an exponent of a GLWE-encrypted monomial, e.g., implemented as a so-called blind rotation. In particular, the programmable bootstrapping may involve computing an encrypted polynomial product of a bootstrapping monomial representing the plaintext value as an exponent, and a test polynomial. The test polynomial may represent a function and/or lookup table evaluation being applied to the input by the programmable bootstrapping. The programmable bootstrapping may use a bootstrapping key that enables to perform the programmable bootstrapping but not the decryption of ciphertexts.

The provided techniques for improved computations on encrypted data may be applied in a wide range of practical applications. Such practical applications include the encrypted evaluation of software programs without having access to plain data. For example, one may evaluate medical diagnostic software on medical data without having actual access to said medical data. Medical data may comprise a medical image. A medical image may comprise, e.g., multi-dimensional image data, e.g., to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

In an embodiment, the provided techniques may be used to evaluate a neural network on encrypted inputs. The party evaluating the neural network may or may not have plaintext access to the trained parameters of the neural network, e.g., weights and biases. In general, the techniques provided herein, e.g., the improved encrypted computation parameters, improve the efficiency of evaluating the neural network and/or reduce storage and transmission requirements for the used ciphertexts or key material.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale.

In the figures, elements which correspond to elements already described may have the same reference numerals. In the drawings, FIG. 1a schematically shows an example of an embodiment of a configuration device.

DESCRIPTION OF EMBODIMENTS

Figure 1A:
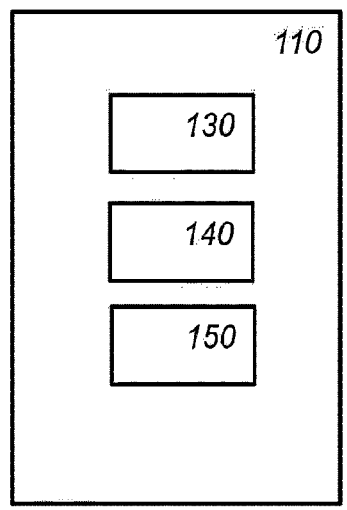
FIG. 1b schematically shows an example of an embodiment of an encrypted computation device.
FIG. 1c schematically shows an example of an embodiment of an encrypted computation system.

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

Various embodiments relate to encrypted computations on noisy ciphertexts. When producing a noisy encryption of an unencrypted value, in other words, when determining a freshly encrypted ciphertext, the noise that is used may be drawn from a distribution, denoted $\chi(\sigma)$, parametrized by a parameter $\sigma$. As an example, the distribution $\chi$ may be a centred Normal distribution, and the parameter $\sigma$ may be a standard deviation.

When performing encrypted operations on ciphertexts, the noise that is included in them is typically modified as a side effect. The link between the input noise and the output noise of an operation may be represented by a noise formula. The noise formula may model the evolution of noise as a result of this operation. In particular, during operations over ciphertexts, the distribution of the noise inside a ciphertext typically changes. In particular, a ciphertext may be said to contain more noise than another if the noise inside the ciphertext is drawn from a normal distribution with a bigger standard deviation $\sigma$.

Specifically, various embodiments use LWE (Learning With Errors) encryption. Generally, an LWE-type ciphertext may comprise one or more mask values and a body value which is derived from the mask values, the plaintext value, and a secret key, and which includes the noise. The values are typically integers modulo a given modulus q. Various embodiments also use GLWE (Generalized Learning With Error)-type ciphertexts. A GLWE-type ciphertext may comprise one or more mask polynomials, and a body polynomial which is derived from the mask polynomials, a plaintext polynomial, and a secret key and which includes polynomial noise. A GLWE-type ciphertext may be defined modulo a modulus q and a quotient polynomial p(X). A LWE ciphertext may be regarded as a particular kind of GLWE ciphertext where the quotient polynomial has degree one. Another particular kind of ciphertext is a RLWE (Ring Learning With Errors) ciphertext where the number of mask polynomials is one.

In particular, a GLWE ciphertext of a message $M \in \mathfrak{R}_q$ under the secret key $S \in \mathfrak{R} \mathfrak{R}^k$ may be defined as follows:

$$CT = \left(A_1, \ldots, A_k, B = \sum_{i=1}^{k} A_i \cdot S_i + \tilde{M} + E\right)$$
$$\in GLWE_S^q(\tilde{M}) \subseteq \mathfrak{R}_q^{k+1}$$

Here, $S=(S_1, \ldots, S_k) \in \mathfrak{R}^k$ is the secret key with coefficients sampled e.g., from a uniform binary, uniform ternary or Gaussian distribution. $\tilde{M}$ is an appropriate encoding, e.g., a scaling, of the input message. $\{A_i\}_{i=1}^{k}$ are polynomials in $\mathfrak{R}_q$ with coefficients sampled e.g. from the uniform distribution in $\mathbb{Z}_q$, E is a noise (error) polynomial in $\mathfrak{R}_q$ such that its coefficients are sampled e.g. from a Gaussian distribution $\chi_\sigma$. The parameter k is a positive integer and represents the number of polynomials in the GLWE secret key. To simplify notations, $S_{k+1}$ may be defined as $-1$. In this example, a LWE ciphertext is a GLWE ciphertext with N=1. In this case, the parameter n=k may denote the size of the LWE secret key and both the ciphertext and the secret may be denoted with a lower case, e.g. $ct^q$ and s, respectively. A RLWE ciphertext in this example is a GLWE ciphertext with k=1 and N>1, e.g., a 2-power.

Generally, the security of GLWE-type encryption depends on the distribution of the secret key (for example, binary, ternary or Gaussian), the product k·N of the GLWE dimension k and the polynomial size N; the amount of noise of a fresh ciphertext; and the modulus q. Given these parameters, it is known per se how to estimate a degree of security that is provided, see, e.g., M. Albrecht et al., "On the concrete hardness of Learning with Errors", Journal of Mathematical Cryptology, 9(3):169-203, 2015 (incorporated herein by reference), and the estimator software available at https://github.com/malb/lattice-estimator. In general, the larger the product k·N, the smaller the minimal noise needed for security.

It may be noted that, as there is a link between the GLWE dimension k, the polynomial size N, and the standard deviation $\sigma$ of the Gaussian noise (e.g. the minimal noise for a given number of bits of security), one of these variable can be computed from the other ones. In particular, throughout this specification, given a particular distribution of the secret key (for example: binary, ternary or Gaussian); the product k·N; and a level of security $\lambda$, the minimal noise in a fresh ciphertext to achieve a level of security may be computed: $(\lambda, k \cdot N) \mapsto \sigma_{min}$.

Although the integer q is used throughout this specification to denote a ciphertext modulus, it is noted that multiple ciphertext moduli may be used within an encrypted multiplication, e.g., with modulus switching being used to align ciphertexts under the same q when needed.

The above examples describe a secret-key, symmetric variant of GLWE. The techniques provided herein apply equally to public-key variants as are known per se. In the latter case, for example, the above secret key may be used as the private key, wherein the public key comprises one or more encryptions of zero, e.g., see R. Rothblum, "Homomorphic encryption: From private-key to public-key", Theory of Cryptography (TCC 2011), vol. 6597 of Lecture Notes in Computer Science, pp. 219-234, Springer, 2011 (incorporated herein by reference).

Various embodiments operate in the TFHE setting, meaning that ciphertexts are used that support a programmable bootstrapping (PBS). The programmable bootstrapping may take as input a ciphertext, and output a ciphertext of the same message, or a function and/or lookup table of that message, with input-independent noise. The PBS may comprise evaluating the homomorphic decryption of the input ciphertext in the exponent of a polynomial. Examples of encryption schemes in the TFHE setting that may be combined with the techniques provided herein, are provided in the following references:

[DM15]L. Ducas et al., "FHEW: bootstrapping homomorphic encryption in less than a second", proceedings EUROCRYPT 2015;

[CGGI16]I. Chillotti et al., "Faster fully homomorphic encryption: Bootstrapping in less than 0.1 seconds", proceedings ASIACRYPT 2016;

[CGGI17]I. Chillotti et al., "Faster packed homomorphic operations and efficient circuit bootstrapping for TFHE", proceedings ASIACRYPT 2017.

Throughout this specification, plaintexts may be represented as integers modulo a modulus q. Such values modulo an integer may equivalently be regarded as elements of a discretized torus, as is done in several of the references mentioned above. In particular, various references use the real torus $\mathbb{T} = \mathbb{R}/\mathbb{Z}$ to express the message and ciphertext spaces, and implement a discretization of $\mathbb{T}$ by using arithmetic modulo $2^{32}$ or $2^{64}$. This can equivalently be seen to correspond to computing with integers in $\mathbb{Z}_q$ (with $q=2^{32}$ or $q=2^{64}$). Accordingly, integers modulo a given modulus and discretized torus elements may be used interchangeably, in particular, there exists an isomorphism between $\mathbb{Z}_q$ and $$\frac{1}{q}\mathbb{Z}/\mathbb{Z}$$

as also noted in the literature, e.g., see C. Boura et al., "CHIMERA: Combining Ring-LWE-based Fully Homomorphic Encryption Schemes", J. Math. Cryptol., 14(1): 316-338, 2020.

The programmable bootstrapping operation in TFHE-like schemes makes them an appealing choice for a wide range of applications. Because bootstrapping is relatively efficient compared to many other FHE schemes, it is much more feasible to perform relatively complex computations, e.g., with a multiplicative depth of at least 10, at least 50, or at least 100. In particular, the cryptographic parameters of TFHE-like schemes can be selected based on the desired precision and resulting computational cost, and do not need to grow in the quantity of homomorphic operations and the circuit depth. In other FHE schemes, in contrast, bootstrapping can be so inefficient that, in practice, these schemes are typically applied in a levelled way, meaning that their parameters are selected depending on a given computation such that it can be performed without the need for bootstrapping. Such a levelled approach is not feasible for more complex computations, however, so in such cases, TFHE-like schemes are particularly beneficial.

In embodiments herein, the parameters of TFHE-like LWE- and GLWE-based ciphertexts that are used may be selected based on a desired security level and based on a desired accuracy of operations such as linear combination of LWE ciphertexts and/or applying a programmable bootstrapping, in other words, a noise level resulting from applying these operations. Interestingly, in the TFHE setting, security parameters may be selected independently of size of the computation, e.g. independently of the multiplicative depth of the computation. This is unlike for non-TFHE-like schemes, where the security parameters are typically chosen to limit or eliminate bootstrappings.

In particular, LWE-based ciphertexts and/or GLWE-based ciphertexts used in the TFHE setting herein may use a relatively small modulus, e.g., of at most 32 bits, at most 64 bits, or at most 128 bits. This modulus is typically selected independently from the computation to be carried out, e.g., it is selected depending on a desired precision and/or efficiency. Parameters N, k, and/or $\sigma$ may be predefined, or may be outputs of the optimization described herein. For example, N may be set to at least 512 and/or at most 2048, 4096, or 16384, e.g., to 1024. For example, in an embodiment, RLWE is used with N at least 512 and/or at most 2048 or 4096, e.g., 1024, and k=1. Such values for N are not typically used in non-TFHE-like encryption schemes, where such values would severely restrict the computations that can be performed; instead, in non-TFHE-like schemes, q and N are typically both selected based on the desired security level, such that q may be much larger.

Throughout this specification, the term "standard score" may be used as follows. Let $A \leftarrow \mathcal{N}(\mu, \sigma^2)$, $p_{err}$ an error probability and $\Phi$ the CDF of A. The standard score for $p_{err}$ may be defined as $$z^*(p_{err}) = \Phi^{-1}\left(1 - \frac{p_{err}}{2}\right) = -\Phi^{-1}\left(\frac{p_{err}}{2}\right),$$

such that $\mathbb{P}_{(A \notin [\mu - z^*\sigma, \mu + z^*\sigma])} \leq p_{err}$.

The standard score may be applied to the confidence interval of a centred normal distribution as follows. Let $A \mathcal{N} \leftarrow (0, \sigma^2)$, $t \in \mathbb{R}$, and $p_{err} \in [0,1]$. Let $z^*(p_{err})$ be the standard score for $p_{err}$. Then:

$z^*(p_{err})\sigma \leq t \Rightarrow \mathbb{P}_{(A \notin [-t, t])} \leq p_{err}$".

FIG. 1a schematically shows an example of an embodiment of a configuration device 110. Device 110 may be for determining encrypted computation parameters for carrying out an encrypted computation on noisy ciphertexts.

Device 110 may comprise a processor system 130, a storage 140, and a communication interface 150. Storage 140 may comprise local storage, e.g., a local hard drive or electronic memory. Storage 140 may comprise non-local storage, e.g., cloud storage. In the latter case, storage 140 may comprise a storage interface to the non-local storage. For example, storage 140 may be for storing data representing a computation graph of the encrypted computation. In this representation, the computation graph may be divided into multiple subgraphs. A subgraph may be defined by a type from a set of one or more types, and by zero or more instantiation parameters for the type.

Device 110 may communicate internally, with other devices, external storage, input devices, output devices, and/or one or more sensors over a computer network. The computer network may be an internet, an intranet, a LAN, a WLAN, etc. The computer network may be the Internet. The device may optionally comprise connection interface 150 which is arranged to communicate with other devices as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. Communication, e.g., internal communication, may use other communication protocols or media, e.g., an internal data bus.

In device 110, the communication interface 150 may be used to send or receive digital data. For example, device 110 may be configured to receive or send data representing a computation to be performed in encrypted form. For example, device 110 may obtain data representing a computation graph of an unencrypted or encrypted computation, where the latter can optionally be divided into subgraphs as described herein already when received. Device 110 may determine encrypted computation parameters to optimally perform this computation in encrypted form. Device 110 may send data representing the encrypted computation parameters, in particular, instructions for an encrypted computation engine for carrying out the computation in encrypted form according to determined encrypted computation parameters.

The execution of device 110 may be implemented in a processor system 130, e.g., one or more processor circuits, e.g., microprocessors, examples of which are shown herein. Device 110 may comprise multiple processors, which may be distributed over different locations. For example, device 110 may use cloud computing.

Processor subsystem 130 may be configured to define respective sets of encrypted computation parameters for the respective types. Processor subsystem 130 may be further configured to perform an optimization of the encrypted computation parameters, including the respective sets of encrypted computation parameters for the respective types. In this optimization, the encrypted computation parameters may be optimized to minimize a computational cost of carrying out the encrypted computation according to the encrypted computation parameters. Further, in this optimisation, the encrypted computation parameters may be constrained to satisfy a noise constraint on ciphertext noise while carrying out the encrypted computation. The noise constraint may be based on respective noise constraints for respective subgraphs. A noise constraint for a subgraph of a given type may be defined by a noise constraint function for the given type that takes at least the encrypted computation parameters for the given type and the instantiation parameters of the subgraph as input.

Some of the figures show functional units that may be functional units of the processor system. For example, a figure may be used as a blueprint of a possible functional organization of the processor system. The processor circuit(s) are not shown separate from the units in most figures. For example, the functional units shown in FIGS. 2-6 (see below) may be wholly or partially implemented in computer instructions that are stored at a device such as device 110, e.g., in an electronic memory of device 110, and are executable by a microprocessor of device 110. In hybrid embodiments, functional units are implemented partially in hardware, e.g., as coprocessors, e.g., arithmetic and/or cryptographic coprocessors, and partially in software stored and executed on device 110.

Figure 1B:
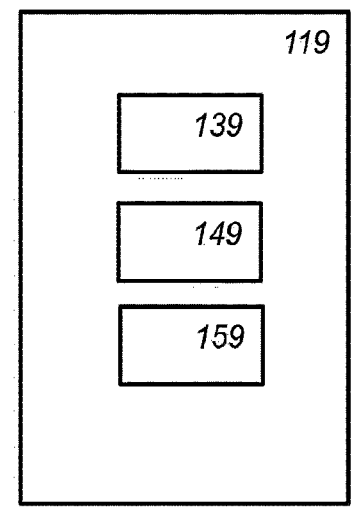

FIG. 1b schematically shows an example of an embodiment of an encrypted computation device 119. Encrypted computation device 119 may be for carrying out an encrypted computation. The encrypted computation may use homomorphic encryption cryptography. For example, the device 119 may be used to perform an encrypted computation, e.g., the device may perform the computation even though said data is received in encrypted form, e.g., from a data provider, and even though the device 119 is not able to decrypt the data. The computation be performed according to encrypted computation parameters determined as described herein, e.g., by device 110 of FIG. 1a. Device 119 may determine the parameters itself, e.g., device 119 may be combined with device 110 of FIG. 1a.

Device 119 may comprise a processor system 139, a storage 149, and a communication interface 159. Processor system 139, storage 149, and communication interface 159 may be implemented as discussed for the respective components of FIG. 1a. Storage 149 may be for storing a representation of the encrypted computation to be carried out, and/or encrypted computation parameters according to which to carry out the encrypted computation. Accordingly, device 119 may comprise the storage 149 storing the encrypted computation parameters. The encrypted computation parameters may be included in the representation of the encrypted computation.

For example, storage 149 may store encrypted data items, e.g., received from one or more data providers or generated as intermediate results or end results, e.g., outputs, of the computation. Typically, most or all data items on which the computation of device 119 is performed, are encrypted with a key (or keys) that is not known to device 119. That is, device 119 may not be configured to obtain the plain data items corresponding to the encrypted data items, e.g., such as stored in storage 149. The decryption key in plain form is secret for device 119, though the encryption/decryption key may be available in encrypted form.

Communication interface 159 may be used to receive a representation of the encrypted computation to be performed and/or the encrypted computation parameters according to which to perform the computation. Communication interface 159 may be further configured to receive encrypted data on which to perform the computation. Communication interface 159 may further be used to send encrypted outputs resulting from the encrypted computation.

Processor subsystem 139 may be configured to carry out the encrypted computation. This may be done as known in the art per se. Interestingly, because processor subsystem 139 uses encrypted computation parameters as described herein, an improved encrypted computation may be performed, e.g., with improved computational efficiency, as discussed throughout this specification.

Figure 8:
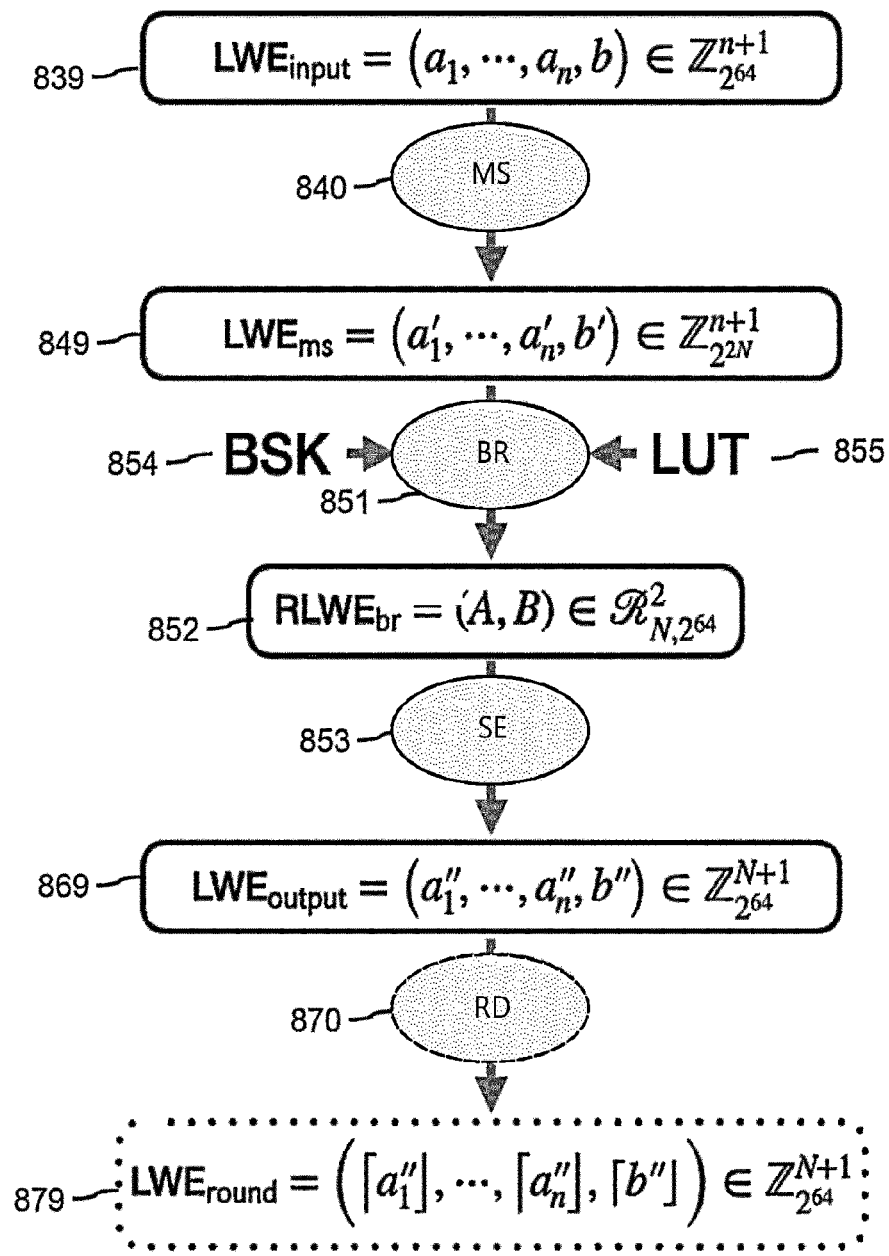
FIG. 8 shows a detailed example of a programmable bootstrapping with noise rounding.

Instead or in addition to using encrypted computation parameters as described herein, the processor subsystem 139 may apply a noise rounding operation to a ciphertext that has implementation-dependent noise, e.g., an output of a programmable bootstrapping, e.g., as discussed with respect to FIG. 8.

Figure 1C:
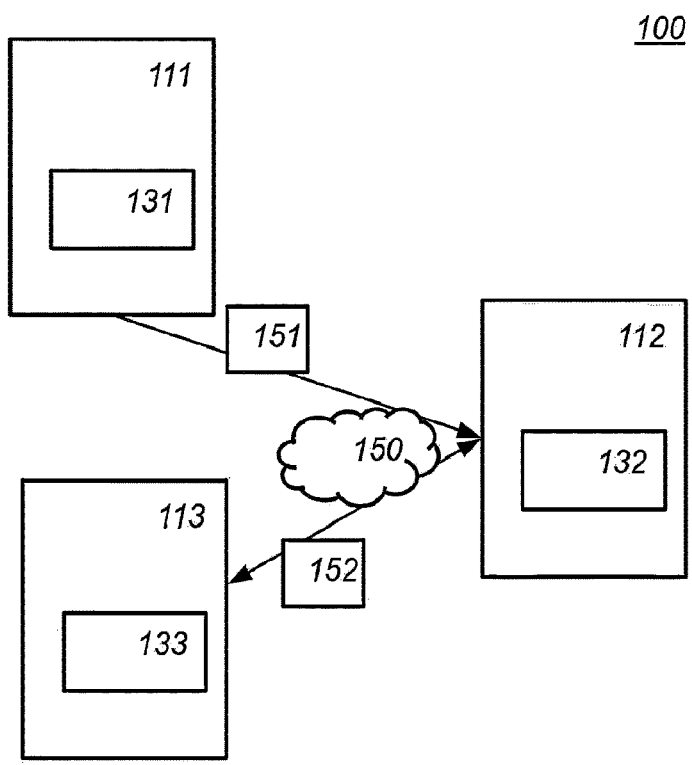

FIG. 1c schematically shows an example of an embodiment of an encrypted computation system 100. System 100 is configured for performing an encrypted computation using homomorphic encryption, e.g., fully homomorphic encryption.

The system 100 in this example comprises a compiler device 111, a data provider device 113 and an encrypted computing device 112. Compiler device 111 may be combined with encrypted computing device 112 or data provider device 113 in a single device. Device 112 may be configured to receive encrypted data items from a data provider 113. At least one or more data items may be received in encrypted form. One or more further data items may be received in plain format. Device 112 may be configured to receive a homomorphic executable for performing the encrypted computation from the compiler device 111.

Device 112 may perform the computation as described herein on the received data items and possibly also on stored data items. Interestingly, the computation may be performed by the device on the encrypted data, without decrypting the data, e.g., without converting encrypted data items to data in a plain format.

Interestingly, device 112 may perform the encrypted computation according to encrypted computation parameters determined as described in this specification. For example, the encrypted computation parameters may be determined by compiler device 111, e.g., the homomorphic executable may be according to the encrypted computation parameters. In such a case, compiler device 111 may be based on device 110 of FIG. 1a, e.g., may comprise processor system 130, storage 140, and/or communication interface 150 of FIG. 1a. It is in principle also possible for the determination of the encrypted computation parameters to be performed by device 112 or device 113 or a different device, however, in which case this device may be based on device 110 of FIG. 1a. Device 112 may be based on device 119 of FIG. 1b, e.g., device 112 may comprise processor system 139, storage 149, and/or communication interface 159 of FIG. 1b.

Optionally, the compiler device 111 or data provider device 113 may be further configured to generate key material for the encrypted computing device 112 to perform the encrypted computation, e.g., including a bootstrapping key for performing a programmable bootstrapping as discussed herein. The device generating the key material may provide the bootstrapping key 151 to device 112, e.g., send it via computer network 150, upload it to a shared storage, etc. Key material can also be generated by a separate key generation device (not shown in this figure).

Although not shown in this figure, the encrypted computation system 100 may comprise multiple encrypted computing devices, e.g., two, three or more than three. The encrypted computation may be distributed among the multiple encrypted computing devices. The encrypted computing devices may exchange intermediate computation results, typically encrypted, among each other. Each encrypted computation device may be implemented like encrypted computing device 112, and may perform encrypted operations as described herein.

Homomorphic encryption schemes can be applied in many settings. For example, encrypted computing device 112 may be operated by a cloud provider. The cloud provider may offer computation and storage services to its clients. By employing homomorphic encryption, data provider device 113, e.g., a client of the cloud provider, can send their data in encrypted form. The cloud provider can still perform the required computations, and/or the required storage, but is not able to know the corresponding to plain data. For example, data provider device 113 may use an encryption key of a type corresponding to the particular homomorphic encryption system used to encrypt the data items. When computations results are received by data provider 113 from encrypted computing device 112, a corresponding decryption key may be used to decrypt the encrypted data items. Encryption and decryption keys may be the same—and typically are so.

For example, encrypted computation system 100 may be configured to train machine-learning models, e.g., image classifiers, e.g., medical models, without the encrypted computing devices having access to the plain data items. For example, linear regression may be performed on the input data, possibly, even without bootstrapping.

For example, back-propagation may be performed on the input data, possibly, with bootstrapping. The resulting model parameters may be returned to an entity who is in possession of the decryption key. This enables multiple providers of medical data to pool their data, by sending the data to a cloud provider. The cloud provider then returns the model parameters, without ever having access to the plain data. Encryption keys may be equal to decryption keys.

After the model is trained, the encrypted computation system 100 may be used to offer the model, say, for use with medical data. This can be done with plain model parameters or encrypted model parameters—in both cases with encrypted data, e.g., encrypted input, intermediate and output data. Using plain model parameters is usually much more efficient. In both cases, an effect of the system is that a computation is performed, say an image classification, e.g., a medical image classification, without the computer knowing the plain data items. For example, a mammogram may be evaluated for cancer, without the image ever being in the plain at an encrypted computing device 112 and without any encrypted computing device 112, or a coalition of such devices, knowing what the outcome of the cancer evaluation is. From a privacy point of view it may be acceptable to operate a plain model on encrypted privacy sensitive data, while it might not be acceptable to operate on plain privacy sensitive data.

Other applications involve database services, e.g., looking up encrypted data in an encrypted database; for example, the computation may be a comparison between an input item and a database item. For example, multiple computations may be combined to produce a database index that matches an index. For example, the database, may be a genomic database, and the input a gene sequence. For example, system 100 may be used for protected control of a device. For example, a device, even a large device such as a power plant, may send sensor values to an encrypted computing device 112, and receive encrypted control signals in return. The control signals being computed from the sensor signals. An attacker of the system may be able to determine the contents of data going to and from one or more encrypted computing devices 112, or even gain access to intermediate data of these devices, but he will not be helped by that as the data is encrypted. Even a full break of all encrypted computing devices 112 of a system 100 will not reveal the data, as the decryption key is not known to these devices. Computing the control signal may involve such mathematical operations as linear algebra, averages, matrix multiplication, polynomial evaluations, and so on, all of which are possible to execute with homomorphic encryption operations.

For example, a pool of encrypted data items may be maintained in the encrypted computation system; a subset of these may be received and another subset may be the result of an encrypted computation, e.g., intermediate results. For example, an encrypted computing device 112 may be configured to apply a homomorphic encryption operation to one, two or more encrypted data items in a pool, e.g., a collection of input and/or intermediate and/or output values. The result may be a new encrypted data item that may be stored in the pool. The pool may be stored in a storage of the encrypted computation system. This may be local storage or a distributed storage. In the latter case, it may happen that one or more encrypted data items are represented multiple times in the pool. Encrypted data items may be sent from one computing device to another, e.g., if their values are needed elsewhere. The pool may be implemented in various ways, e.g., as a register file, an array, various data structure, and so on.

The encrypted data items may represent all kinds of data. For example, encrypted data items may represent numbers that need to be averaged, or which are used for linear regression, etc. For example, the encrypted data items may represent an image. For example, each pixel of the image may correspond to one or more encrypted data items. For example, a grey-scale pixel may be represented by a grey level, which in turn may be represented by a single encrypted data item. For example, 256 grey levels may be encoded in a single encrypted data item. For example, a colour pixel may be represented as multiple colour levels, e.g., RGB levels, which in turn may be represented by a tuple of encrypted data items. For example, three 256-level colours may be encrypted as respective encrypted values.

A set of homomorphic encryption operations may be defined for the computation. For example, from the homomorphic encryption operations a computation graph of the encrypted computation, also known as a network or circuit of operations, may be built that together implement the computation, e.g., by a compiler device 111 or by the computation device 112 itself. For example, the operations may include Boolean operations. The way the homomorphic encryption operations are combined, e.g., which operation is applied to which operand in the pool, determines the computation that is being performed. For example, the computation may be represented as a list of homomorphic encryption operations that are to be performed together with an indication on which encrypted data item they are to be performed, thereby implicitly defining the computation graph by their input/output relations.

Figure 2:
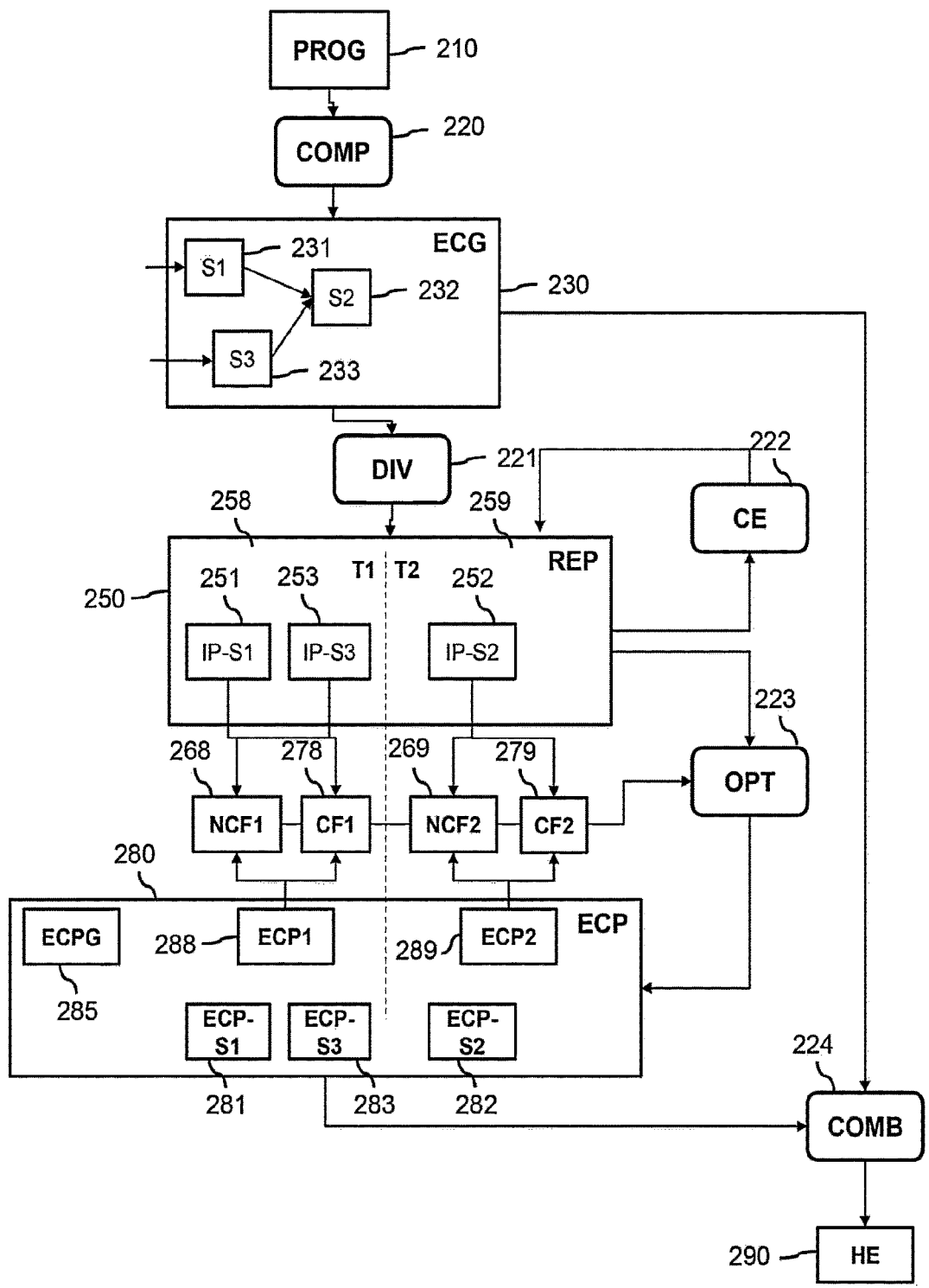
FIG. 2 shows a detailed example of how to determine parameters.

FIG. 2 shows a detailed, yet non-limiting, example of how to determine encrypted computation parameters for carrying out an encrypted computation on noisy ciphertexts.

As illustrated in the figure, the encrypted computation may be considered to correspond to an encrypted computation graph ECG, 230 (also referred to as an "FHE DAG"). The encrypted computation graph ECG may be represented explicitly in memory, or implicitly, e.g., as executable code, as a list of instructions, etc. The encrypted computation graph ECG may be a directed acyclic graph of encrypted operations, also referred to as "FHE operators". An encrypted operation may take as input one or more ciphertexts and/or plaintexts and may provide as output one or more ciphertexts.

Below, $\mathcal{G}$ is used to denote a FHE graph ECG composed of FHE operators. Mathematically, $\mathcal{G}=(V, E)$ may represent a directed acyclic graph (DAG) of FHE Operators $\{\mathcal{O}_i\}_{i \in I}$, where $V = \{O_i\}_{i \in I}$ is the set of vertices, being FHE operators; and E is the set of edges of $\mathcal{G}$. For ease of exposition, where the set of edges E is not needed, the graph may be identified with its set of vertices, $\mathcal{G} = V$.

For example, a FHE operator may represent a homomorphic addition (of ciphertexts and/or plaintexts), a homomorphic multiplication with a plain value, a key switching, a modulus switching, a blind rotation, a sample extraction, etc. In various examples, for simplicity, a blind rotation and sample extraction are together represented as one FHE operator, since these typically occur together in an encrypted computation.

Optionally, the encrypted computation graph ECG may be obtained by performing a compilation COMP, 220, that takes as input an unencrypted computation graph PROG, 210, and transforms the graph into the encrypted computation graph ECG. The compilation COMP may act on a graph of plain operators PROG. By using the provided techniques, this graph PROG may be transformed into a corresponding graph of FHE operators ECG with a correct and optimized set of parameters ECP, 280.

In graph PROG, a plain operator may be an operator that operates over data that is marked as confidential and/or data that is marked as plain data, and that outputs confidential data. Data that is marked as confidential may be encrypted in the resulting encrypted computation. For example, some or all plain operators may be selected from:
  addition between confidential data;
  addition between confidential data and plain data;
  multiplication between confidential data;
  multiplication between confidential data and plain data; and
  unary function application.

Compilation COMP may map a plain operator to a respective set of one or more FHE operators. Both the plain operator and the set of FHE operators may compute the same operation, with the former operating on plain and confidential data, and the latter operating on plaintexts and ciphertext. For this, techniques can be used that are known in the art per se. Interestingly, for the resulting graph ECG, the techniques described herein can be used to find the best encrypted computation parameters.

In a division operation DIV, the computation graph $\mathcal{G}$, ECG may be divided into multiple subgraphs $\{\mathcal{G}_i\}$. A subgraph may be defined by a type from a set of one or more types, and by zero or more instantiation parameters for the type. The subgraphs of a certain type may have in common that the same FHE operators are applied in the same order. For this purpose, a number of additions and scalar multiplications together may be regarded as a single FHE operator representing a linear map, as also exemplified in FIG. 4a and elsewhere. In this case where the subgraph comprises a linear map, the linear map that is applied (or its 2-norm, which turns out to be sufficient to perform various optimization) can be one of the instantiation parameters, for example. A type of subgraph is also referred to as an atomic pattern (AP) kind.

Figure 4A:
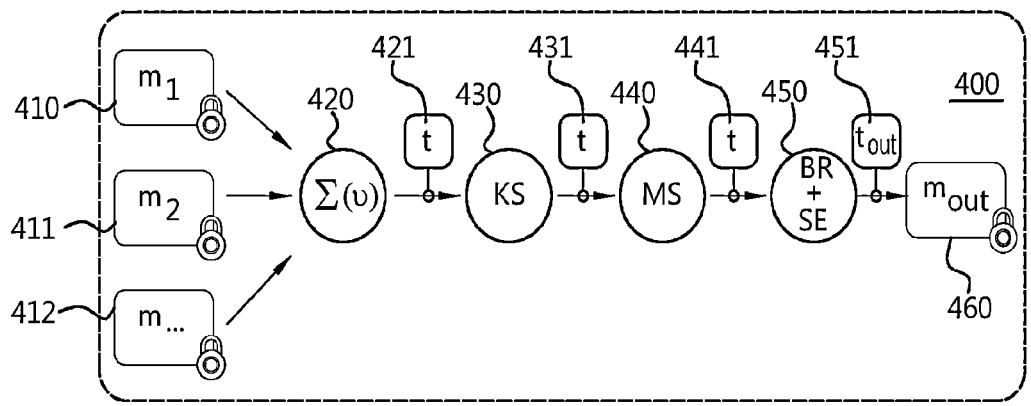
FIG. 4a shows a detailed example of a type of subgraph.
Figure 6A:
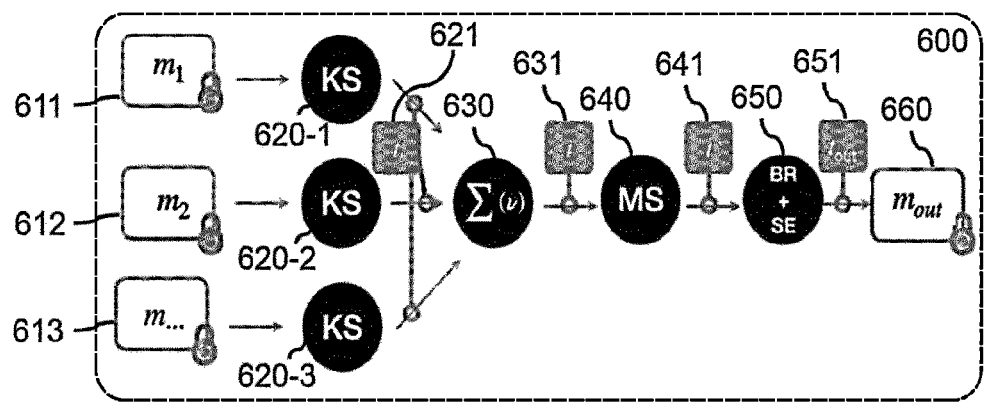
FIG. 6a shows a detailed example of a type of subgraph.
Figure 6B:
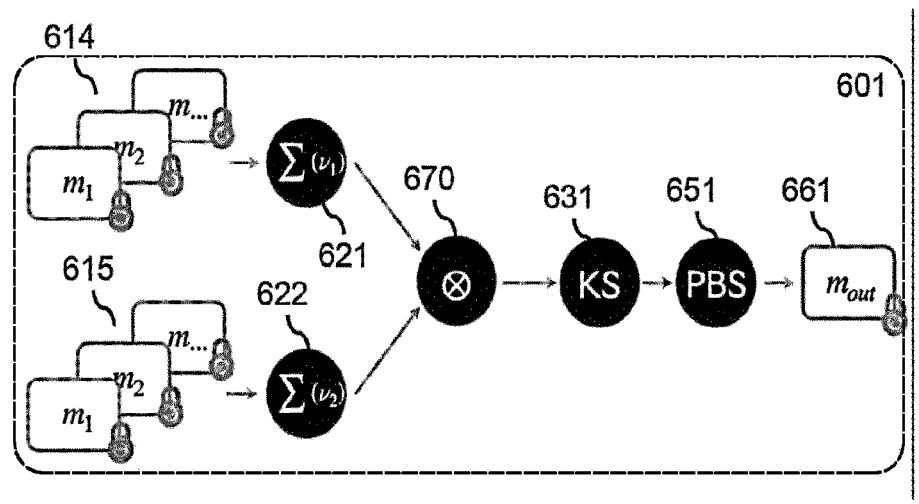
FIG. 6b shows a detailed example of a type of subgraph.

Examples of types of subgraph are discussed e.g. with respect to FIGS. 4a, 6a, and 6b. The subgraphs of a certain type may have in common that, for certain FHE operators, such as a key switching or a blind rotation, the same key material is used; but it is also possible to have the key material used as a parameter, as discussed e.g., with respect to FIG. 7a.

In particular, a subgraph may represent a subcomputation resulting in an output ciphertext with an input-independent noise. For example, the output ciphertext can be an output of a programmable bootstrapping or of a rounding of an output of a programmable bootstrapping. Accordingly, division operation DIV may operate on the encrypted computation graph ECG by dividing the graph into subgraphs at the outputs of respective sets of operations that result in input-independent noise, e.g., at respective instances where a blind rotation+sample extraction, or a blind rotation+sample extraction+rounding is applied.

As an illustration, the figure shows an encrypted computation graph ECG comprising three subgraphs S1, 231; S2, 232; and S3, 233. In this example, subgraphs S1 and S3 have a common first type T1, 258, and subgraph S2 has a second type T2. Accordingly, the division DIV may lead to a representation REP, 250, of the encrypted computation graph by instantiation parameters IP-S1, 251; IP-S3, 253 for instantiating the first type T1 to obtain the respective subgraphs S1, S3; and instantiation parameters IP-S2, 252, for instantiating the second type T2 to obtain subgraphs S2.

The number of subgraphs can be relatively large, e.g. at least 100, at least 1000, or at least 10000. The number of different types of subgraph occurring in a given encrypted computation graph is typically limited, e.g., to one, to at most or at least two, or to at most or at least three. The graph may be partitioned into the subgraphs, e.g., each node of the graph may occur in exactly one subgraph. The number of instantiation parameters for a subgraph type can be zero, one two, at most or at least three, or at most or at least five, for example. Different types of subgraph can have different numbers of instantiation parameters. Examples are given throughout this specification.

Generally, the way in which the FHE operations of the encrypted computation graph ECG are carried out, may depend on the values of a set of encrypted computation parameters ECP, 280.

The encrypted computation parameters ECP may comprise a set of global encrypted computation parameters ECPG, 285. These parameters may for example include parameters of the encryption scheme used, such as the GLWE dimension k and/or the polynomial size N and/or their product k·N. The number of global parameters can be at most or at least 2, or at most or at least 5, for example.

The encrypted computation parameters ECP may further comprise respective encrypted computation parameters ECP1, 288, ECP2, 289 for the respective types T1, T2. For example, these parameters may comprise a decomposition base B and/or decomposition level e of a programmable bootstrapping and/or key switching that occurs in subgraphs of that type. In particular, for different types of subgraph, the values for these parameters may differ, although it is also possible to share these parameters between different types. The encrypted computation parameters ECPi are however shared between different subgraphs that have the same type, thereby simplifying the optimization of the encrypted computation parameters compared to defining these parameters separately for separate FHE operations or subgraphs.

The encrypted computation parameters ECP may further optionally comprise respective subgraph-specific parameters ECP-S1, 281, ECP-S2, 282, ECP-S3, 283, for the respective subgraphs S1, S2, S3. Such parameters can for example identify a set of bootstrapping or key switching keys to be used in the subgraph (as illustrated with respect to FIG. 7a), and/or indicate a number of programmable bootstrappings to perform as part of a linear map (as illustrated with respect to FIG. 7b).

The subgraph-specific parameters ECP-Si typically do not provide values of cryptographic parameters, such a as a decomposition base or level: these are typically defined as type-specific encrypted computation parameters ECPi or even global encrypted computation parameters ECPG. This improves the efficiency of the optimization, and moreover limits the number of different values that such parameters can have, and thereby for example the number of different key switching and bootstrapping keys that are needed to perform the encrypted computation.

In order to determine values for the encrypted computation parameters ECP, an optimization OPT, 223, may be performed. The optimization may be configured to look for values for the encrypted computation parameters ECP that minimize a computational cost Cost($\mathcal{G}$, x) of carrying out the encrypted computation $\mathcal{G}$ according to the encrypted computation parameters x, while ensuring a desired level of security, and the correctness of the computation result (up to a given probability).

The optimization OPT may guarantee security and correctness by constraining the encrypted computation parameters to satisfy a noise constraint on the ciphertext noise that occurs while carrying out the encrypted computation. Examples of establishing such a noise bound are discussed with respect to FIG. 3.

In particular, the noise bound may guarantee a desired level of security by setting the ciphertext noise of a fresh encryption based on the security parameters of the encryption scheme such that the desired level of security is provided. In particular, as also discussed elsewhere, given a security level $\lambda$ and cryptographic parameters k·N, e.g., comprised in the global parameters EPG, the noise of a fresh ciphertext may be given by a mapping ($\lambda$, k·N)$\mapsto \sigma_{min}$, defined such that the fresh ciphertext contains sufficient noise to hide the plaintext. In other words, by not considering the encryption noise as a variable but as an output of the mapping given a level of security, it can be ensured that the security will be at least the requested value.

Regarding the correctness of the computation result, it is noted that, if ciphertext noise grows above a threshold, then decryption no longer returns the correct plaintext with sufficient probability. This threshold on the amount of ciphertext noise may be referred to as the noise bound. The noise bound can be global, or can differ between parts of the computation depending on the precision desired at that point during the computation, in which case it can be defined based on an instantiation parameter IP-Si of a subgraph, for example. The noise bound(s) can be manually specified or computed for example based on a desired precision (e.g., number of bits needed to represent the encrypted value) and a maximal desired error probability of the decryption.

Generically, the optimization problem to which the optimization OPT finds a solution, may be defined as follows. For a given encrypted computation parameter x, a corresponding set of possible values may be defined, denoted $\varepsilon_x$ and referred to as the search space of x. The search spaces are typically discrete. The Cartesian product of the search spaces may be denoted $\varepsilon g$ and may be referred to as the search space of the encrypted computation graph g. In this specification, the graph $\mathcal{G}$ is sometimes omitted for brevity with the search space of the encrypted computation graph denoted E.

Figure 3:
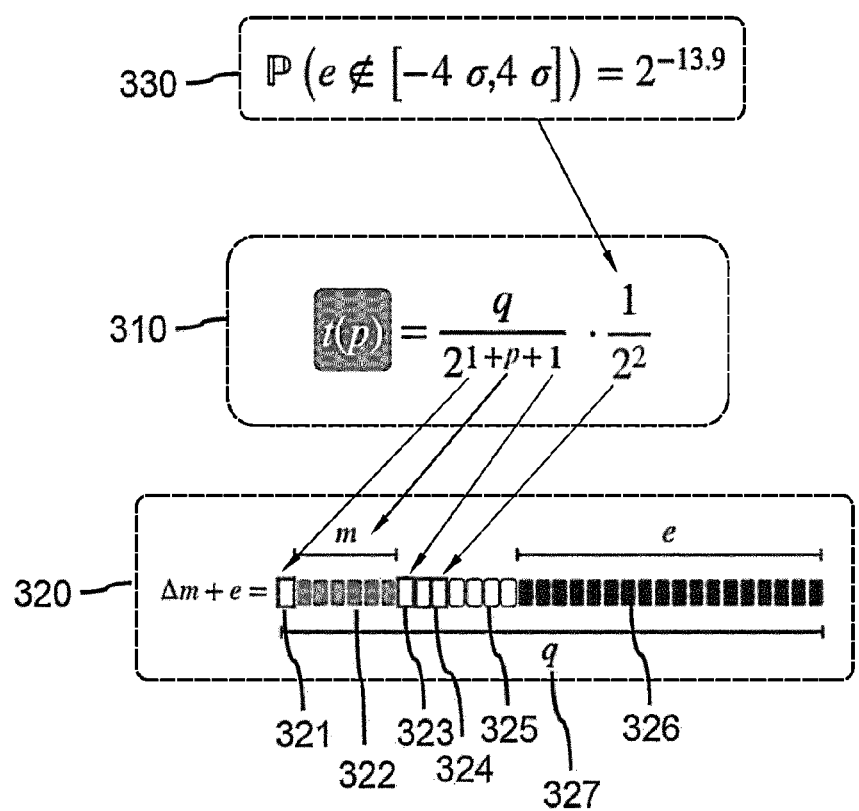
FIG. 3 shows a detailed example of a constraint on ciphertext noise.

Generally, some solutions in the search space generate too much noise. The noise feasible set is defined as the set of encrypted computation parameters ECP satisfying the noise constraint, e.g.:

$$\mathcal{S}_\mathbb{N}(\mathcal{G})=\{x\in\varepsilon | \forall i, \mathbb{N}_{\mathcal{O}_i}(x)\le t(p_i)^2\}\subset\varepsilon$$

with $\mathbb{N}_{\mathcal{O}_i}(x)$ the noise of the output ciphertext of a FHE operation $\mathcal{O}_i$, and $t(p_i)^2$ the corresponding noise bound, e.g., defined as discussed with respect to FIG. 3. As also discussed with respect to FIG. 3, it is noted that the noise bound t(•) may implicitly incorporate a maximal desired error probability of decryption.

In addition to the noise constraint, there can be further constraints that the optimization OPT is configured to take into account, for example, a limit on the size of the public keys and/or ciphertexts. A constraint can relate one or more encrypted computation parameters to each other, for example. Generically, such further constraints may define a further feasible set $\mathcal{S}_{other}(\mathcal{G})$.

Accordingly, the optimization problem may be phrased as $$\arg\min_{x\in\varepsilon}\text{Cost}(\mathcal{G},x) \text{ s.t. } x\in\mathcal{S}_\mathbb{N}(\mathcal{G}) x\in\mathcal{S}_{other}(\mathcal{G}).$$

In general, phrased in this way, the above optimization problem has a large search space $\varepsilon$ (exponential in the number of variables) and a noise feasible set $\mathcal{S}_\mathbb{N}(\cdot)$ that is not easy to find with knowledge of the search space $\varepsilon$.

Interestingly, by dividing the computation graph into subgraphs of respective types, the optimization problem may be simplified. In particular, this division may make it computationally less expensive to test if a solution is in the feasible set $\mathcal{S}_\mathbb{N}(\mathcal{G})$.

In particular, the noise constraint may be defined as being based on respective noise constraints for the respective subgraphs Si. Here, a noise constraint for a subgraph Si of a given type Tj may be defined by a noise constraint function NCF1, 268; NCF2, 269 for that given type T1, T2. The noise constraint function NCFj may take at least the encrypted computation parameters ECPj for the given type Tj, and the instantiation parameters IP-Si of the subgraph Si as input.

More precisely, the noise constraint may be defined as $$\mathcal{S}_\mathbb{N}(\mathcal{G})=\cap_i \mathcal{S}_\mathbb{N}(A_i).$$

Here, the noise constraint $\mathcal{S}_\mathbb{N}(A_i)$ of a subgraph $A_i$ may be defined by a noise constraint function for the type of subgraph $A_i$.

In general, the noise constraint for a type of subgraph may be obtained by propagating a noise estimate of an input of the subgraph through the operations of the subgraph. In general, if the graph ECG is divided into subgraphs that have outputs with input-independent noise, e.g., PBS outputs or rounded PBS outputs, then the inputs of the subgraph may be assumed to have a fixed noise, e.g., derived from global encrypted computation parameters ECPG; and the noise may be assumed to increase throughout the subgraph, such that the noise constraint can for example constrain the noise of the input of the PBS (or other noise-fixing operation) to be small enough to ensure sufficient accuracy. A detailed example is given with respect to FIG. 4b.

Interestingly, the noise constraints of respective subgraphs of the same type are thus defined by the same function NCFj, making the satisfaction of these constraints more amenable to manual or automatic simplification. In particular, a constraint elimination operation CE, 222, may be performed in which it may be determined, based on the instantiation parameters IP-Si1 of a first subgraph and IP-Si2 of a second subgraph, that the noise constraint for the first subgraph Si1 is at least as strict as the noise constraint for the second subgraph Si2. As exemplified elsewhere in this specification, this can be the case if the subgraphs are of the same type, but also if the subgraphs are of different types. In any case, in such a case, the noise constraint for the second subgraph can be eliminated from the optimization, making the optimization Opt easier to perform. In other words, the noise feasible set $\mathcal{S}_\mathbb{N}$ may be a subset of each of the respective feasible sets of the subgraphs, so a noise feasible set that is a superset of another noise feasible set does not affect the computation of $S_\mathbb{N}$. A detailed example of this is given with respect to FIG. 5.

It is noted that, if a further feasible set $S_{other}$ is used, then the same technique can also be used to eliminate constraints for respective subgraphs from the computation of that feasible set as well.

Generally, the optimization OPT may evaluate the computational cost of carrying out the encrypted computation in various ways, e.g., by performing a simulation or by measuring the actual computational costs of performing the encrypted computation.

A particularly efficient way of evaluating the computational cost is by using a cost function that can be computed based on the encrypted computation parameters ECP without simulation or measurement, e.g., as a closed formula. In particular, the cost function may be based on respective costs for respective subgraphs. Such a cost for a subgraph of a given type Tj may be defined by a cost function CF1, 278, CF2, 279, for the given type T1, T2. The cost function typically depends on the encrypted computation parameters ECPj for the given type Tj, allowing these parameters ECPj to be optimized with respect to the cost function.

Interestingly, as an approximation, the cost function CFj may be defined to be independent from the instantiation parameters IP-Si for a particular subgraph Si. This is a reasonable approximation that greatly simplifies the optimization OPT, since the parameters can be optimized per type of subgraph instead of per subgraph.

As an illustrative example, consider a type of subgraph that comprises a linear map (in other words, multisum), a key switching, a modulus switching, a blind rotation, and a sample extraction. These respective operations have respective costs that in general depend at least on the encrypted computation parameters ECP. For the key switch, the modulus switching, the blind rotation, and the sample extraction, the cost function typically does not depend on the instantiation parameters.

For the linear map, it is possible to define the cost function such that 1) the cost function does not depend on the linear map being applied (e.g., the number of additions and/or the values of the scalars that are being multiplied with), or 2) the cost function does depend on the linear map.

In the first case, a simplification of the optimization problem solved by optimization OPT is possible, since the cost of the linear map does not depend on the number of additions/multiplications but only on non-instance specific parameters ECPG, ECPi. For example, the cost for the subgraph may be defined as the sum of the costs of the respective operations, which do not depend on the instantiation parameters:

$\forall x \in \varepsilon, \text{Cost}(A(v,t),x) = \text{Cost}(\Sigma(v)x) + \text{Cost}(KS,x) + \text{Cost}(MS,x) + \text{Cost}(BR,x) + \text{Cost}(SE,x)$ As a consequence, the cost of different subgraphs of the same type in $\mathcal{G}$ are the same. Accordingly, the optimization $\arg\min_{x \in \varepsilon} \text{Cost}(\mathcal{G},x) \text{ s.t. } x \in S_\mathbb{N}(\mathcal{G}) x \in S_{other}(\mathcal{G})$ may be simplified to optimization problem:

$\arg\min_{x \in \varepsilon} \text{Cost}(A(\cdot,\cdot),x) \text{ s.t. } x \in S_\mathbb{N}(\mathcal{G}) x \in S_{other}(\mathcal{G})$ The cost function may be defined as a sum of the respective costs for respective subgraphs, but this is not needed. More generally, the cost may be defined by combining the costs for respective subgraphs, or subgraph types. Also the cost Cost(A(v, t), x) or Cost(A(·,·), x) for a particular subgraph does not need to be a sum of the costs of respective operations. For example, the cost for a subgraph may be defined as polynomial in the cost of the respective operations of the subgraph. Such more general costs functions may for example be used to optimize for latency, wherein the cost function may be configured to take into account that several operations of a subgraph, and/or several subgraphs, can be evaluated in parallel.

In general, there are many different ways for optimizer OPT to determine the encrypted computation parameters ECP. For example, the optimizer may perform a brute-force search. Interestingly, this may be feasible especially if constraint elimination CE is performed, as described herein.

A preferred way of determining the encrypted computation parameters ECP is by branch-and-bound. As is known per se, using branch and bound, an optimal solution in terms of computational cost may be found based on given upper and lower bounds on the computational cost. Given these bounds, branch-and-bound can be much more efficient than a brute force search.

In particular, the branch-and-bound may be performed by first efficiently finding a set of feasible parameters, and then using the feasible parameters to derive a lower and/or upper bound.

As an example, consider an encrypted computation graph comprising one or more subgraphs of the type illustrated in FIG. 4a. As discussed with respect to that figure, such subgraphs may be represented as $A_i = A(v_i, t_i)$ with $v_i$ the 2-norm of the applied linear map, and $t_i$ the noise bound. A set of feasible parameters may be found by replacing all subgraphs of this type by a single subgraph $A(v_{max}, t_{min})$ with $v_{max} == \max\{v_i\}_{i \in I}$ and $t_{min} = \min\{t_i\}_{i \in I}$. By construction, it may be guaranteed that solving the optimization problem on this graph outputs a feasible solution for the input graph g. The optimization problem may then be solved on this graph, storing the optimal parameters.

For a given encrypted computation graph $\mathcal{G} = \{A(v_i, t_i)_i\}$, where $\forall i, v_i \in I_{norm}$ and $t_i \in I_p$, a table of feasible parameters may be constructed by performing the optimization Opt respectively for the respective subgraphs. Namely, the optimization problem may be solved for respective graphs $\mathcal{G} = \{A(v, t)\}$ with $v \in I_{norm}$ and $t \in I_p$, e.g., solving the optimization problem $|I_{norm}| \cdot |I_p|$ times. This way, for respective pairs (v, t), respective admissible sets of parameters may be determined.

In particular, in order to perform the optimization for the subgraphs, lower and upper bounds derived from the noise and cost model may be used. As an illustrative example, for noise function $$\text{noise}_{KSK} = x \cdot l \cdot \mathcal{B}^2 + y \cdot \frac{1}{\mathcal{B}^{2l}}$$

the following lower bound may be used:

$$\text{noise}_{KSK}([l_{min}, l_{max}], [\mathcal{B}_{min}, \mathcal{B}_{max}]) = x \cdot l_{min} \cdot \mathcal{B}_{min}^2 + y \cdot \frac{1}{\text{base}_{max}^{2l_{max}}}.$$

Having determined the table of feasible parameters, the table may be used to efficiently derive upper and lower bounds for an encrypted computation graph $\mathcal{G}$ with $v_{max} = \max\{v_i\}_{i \in I}$ and $t_{min} = \min\{t_i\}_{i \in I}$. Moreover, an initial solution for the optimization may be determined based on the table. Interestingly, the table allows to efficiently determine a relatively good initial solution, which improves efficiency of the optimization.

As an illustrative example, the lower and upper bounds can take into account a number of programmable bootstrappings for a linear map, as discussed with respect to FIG. 7b as follows.

The lower bound may be derived based on the parameters corresponding to the maximum number of programmable bootstrappings, while not taking into account the cost of the programmable bootstrapping. In particular, the maximum splitting possible may be taken, reducing the noise at the output of each split multisum. Neglecting the cost of the added PBSs, the input graph may be transformed accordingly, and $v_{max}$, $t_{min}$=max$\{v_i|A(v_i, t_{min}) \in \mathcal{G}\}_{i \in I}$ may be computed, taking the maximum 2-norm for the minimal noise bound). The parameters for the case ($v_{max, t_{min}}$, $t_{min}$) may be selected from the table of feasible parameters. Interestingly, although those parameters may be non-admissible for $\mathcal{G}$, they may nonetheless give a lower bound on the complexity, since an admissible solution for $\mathcal{G}$ may be at least as costly as the one chosen in this way.

The upper bound may be derived based on the parameters corresponding to the minimum number of programmable bootstrappings, while including the costs of performing the maximum number of programmable bootstrappings. In particular, taking the minimum splitting possible and taking into account the cost of the added PBSes, the input graph can be transformed accordingly, and the parameters for the case ($v_{max}$, $t_{min}$) may be obtained from the table of feasible parameters. This way, an upper bound on the complexity can be obtained.

Having determined the encrypted computation parameter ECP, a combining operation COMB, 224, may be applied in which the parameters ECP may be substituted into the encrypted computation graph ECG that they parameterize. Accordingly, the computation graph ECG may be compiled into a set of instructions HE, 290 for an encrypted computation engine. By executing the instructions HE, the encrypted computation may be carried out according the determined encrypted computation parameters ECP; by the same device that performs the optimization OPT or, more typically, by a different device that receives the instructions HE for execution.

FIG. 3 shows a detailed, yet non-limiting, example of a constraint on ciphertext noise. In particular, an example is given of deriving a noise bound from a desired precision, given an encoding of values into ciphertexts, and given a desired maximum error probability. Such a noise bound may be used to define a noise constraint for a subgraph, as also discussed with respect to FIG. 2. In particular, the noise constraint may be defined by determining a maximal ciphertext noise of the type of subgraph, and constraining this maximal noise to remain below the noise bound.

In particular, a noise bound t(•) may be a threshold that is applied to the noise of a ciphertext. The noise bound may be parametrized by an error probability, which can be user-configurable. The error probability can also be hard-coded. It is noted that, for security reasons, the exact noise included in a ciphertext is not known to the party performing an encrypted computation. However, this party does typically know the variance of the probability distribution of the noise at a certain point in time, assuming that the inputs provided to it have a given variance. Accordingly, the noise bound may represent a limit in terms of variance of the error in the ciphertexts. Generally, the noise bound may depend on the number of bits of precision that are used to represent the message, and the desired probability of decryption being correct.

As an illustrative example, the figure shows a noise bound 310 on an LWE-type ciphertext based on an encoding 320 of a message m. The presented way of deriving the noise bound applies to various encrypted computation techniques, for example, as proposed in the following references:

TFHE: I. Chillotti et al., "Faster fully homomorphic encryption: Bootstrapping in less than 0.1 seconds", proceedings ASIACRYPT 2016 and I Chillotti et al., "Faster packed homomorphic operations and efficient circuit bootstrapping for TFHE", proceedings ASIACRYPT 2017;

FHEW: L. Ducas et al., "FHEW: bootstrapping homomorphic encryption in less than a second", proceedings EUROCRYPT 2015;

BFV: J. Fan and F. Vercauteren, "Somewhat Practical Fully Homomorphic Encryption", http://eprint.iacr.org/2012/144;

CKKS: Jung Hee Cheon et al., "Homomorphic Encryption for Arithmetic of Approximate Numbers", proceedings ASIACRYPT 2017.

In the example illustrated in the figure, the message m, 322 has a bit length p and is encrypted in a single ciphertext in the most significant bits. In particular, the LWE ciphertext may be a tuple ($a_1$, . . . , $a_n$, b) with $$b = \sum_{i=1}^{k} a_i \cdot s_i + e + \Delta m$$

such that:
($s_1$, . . . , $s_k$) $\in \mathbb{Z}_q^k$ is the secret key with coefficients sampled according to a given distribution, e.g., uniform binary, uniform ternary or Gaussian;

$\{a_i\}_{i=1}^k$ are integers in $\mathbb{Z}_q$ sampled from the uniform distribution in $\mathbb{Z}/q\mathbb{Z}$;

e+$\Delta$m is the encoding 320 of the message, comprising the error e, 326, sampled from a centred Gaussian distribution $\chi_\sigma$, and the message $\Delta$m, 322, re-scaled in the most significant bits.

In this example, the noise term e, 326 is sampled from a Gaussian distribution. The noise bound may be defined based on a threshold on the variance of the noise term such that if the noise remains below this threshold, the computation is correct up to a given probability $p_{err}$.

In particular, the figure illustrates:
the ciphertext modulus q, 327, e.g., a power of two such as $2^{32}$, $2^{64}$, or $2^{128}$, or a non-power of two such as a prime number;

the message m, 322 with precision p, e.g., a number of bits used to encode the message;

the MSB, 321, set to 0, as is needed for various programmable bootstrapping implementations;

a padding bit 323 to prevent noise from contaminating the message m at decryption time due to rounding;

further bits 324 corresponding to a standard score $z^*(p_{err})$=4 corresponding to an error probability 330 of $p_{err} \approx 2^{-13.9}$.

As illustrated in the figure, the noise bound 310 may be obtained based on the number of bits needed for the padding 321, message 322, padding 323, and error margin 324. The noise bound 310 may require the variance of the noise 326 to remain below this value. In this particular case, there is room 325 between the noise bound and the error, so the noise constraint is satisfied.

The above example can be adapted to various other encodings as desired. For example, the MSB 321 can be removed in case the programmable bootstrapping does not need it, as proposed for example in I. Chillotti et al., "Improved programmable bootstrapping with larger precision and efficient arithmetic circuits for TFHE", proceedings ASIACRYPT 2021, or Z. Liu et al., "Large-precision homomorphic sign evaluation using FHEW/TFHE bootstrapping", Cryptology ePrint Archive 2021/1337. A programmable bootstrapping without padding bit 321 is also referred to as "WOPBS" in this specification. This results in a noise bound that is twice as high, e.g.:

$$t(p) = \frac{q}{2^{p+1} z^*(p_{err})}.$$

More generally, the noise bound may be computed as $$t(p) = \frac{q}{2^{pad_{right}+p+pad_{left}} \cdot z^*(p_{err})}$$

where $pad_{left}$ can be any number of bits of padding at the left of the message and $pad_{right}$ can be any number of bits of padding at the right of the message.

Interestingly, given an encoding and an error probability, the noise bound may depend just on the desired precision for the message m. In particular, the number of possible values that the noise bound can attain may be relatively small, for example, the number of possible values may be at most 10 or at most 20. As also described elsewhere, this limited number of possible values can be used advantageously when optimizing encrypted computation parameters.

FIG. 4a shows a detailed, yet non-limiting, example of a type of subgraph. This type of subgraph is also referred to as an atomic pattern of type 1.

In this example, the subgraph 400 comprises a linear map 420 on one or more input ciphertexts 410-412. The linear map may comprise one or more homomorphic additions of ciphertexts by another ciphertexts and/or plaintext, and/or one or more homomorphic multiplications of ciphertexts by a scalar. Generally, any number of such operations, e.g., ciphertext/plaintext or ciphertext/ciphertext additions and multiplication between a plaintext and a ciphertext, may be represented as a dot product between a vector of ciphertexts and a vector of plaintexts. Accordingly, linear map 420 may represent the computation of this dot product. The linear map 420 may have the vector of respective plaintexts corresponding to respective input ciphertexts 410-412 as instantiation parameters; but interestingly, for the purpose of performing the optimization, it may be sufficient to represent the linear map 420 just by the 2-norm of the vector of plaintexts. Accordingly, the subgraph may have the 2-norm of the vector of plaintexts corresponding to the linear map 420 as an instantiation parameter.

In addition to the linear map 420, the subgraph 400 comprises a key switching 430; and a programmable bootstrapping, in this case implemented by a modulus switching 440, followed by a blind rotation and sample extraction 450, resulting in output ciphertext 460. Since the output ciphertext 460 results from a programmable bootstrapping, interestingly, its noise can be input-independent (at least when the noise constraints are satisfied), e.g., independent of the noise of the input ciphertexts 410-412 and the 2-norm of the linear map 420. For the purposes of this figure, the blind rotation and sample extraction are represented by a single node 450; but it is also possible to represent them as respective nodes.

In many cases, the overall computation graph may be divided into subgraphs that result in input-independent noise. E.g., the input ciphertexts 410-412 may result from an encryption operator or a programmable bootstrapping (with optional rounding). In such a case, the noise of the input may be assumed to be bounded by the maximum of the input-independent noises that are used, e.g., by the noise resulting from a programmable bootstrapping. Respective operations 420-450 may result in respective ciphertext noise while carrying out the computation represented by the subgraph, which may be obtained by propagating the noise of the input (e.g., given by the discussed bound, or as an instantiation parameter) throughout the graph, as discussed e.g. with respect to FIG. 4b.

Apart from the 2-norm of the applied linear map 420, the subgraph 400 may further parameterized by an instantiation parameter representing a noise bound 421, 431, 441, 451 that the ciphertexts output by operations 420-450 may be required to meet. Interestingly, it may be observed that operations 420, 430, 440 typically increase the noise, whereas the output noise of the blind rotation 450 is independent of the noise of its input. Accordingly, to verify that the subgraph satisfies a noise constraint, it may be sufficient to verify this bound 451 just for the noise of the input of the blind rotation 450.

The encrypted computation parameters for the type of subgraph 400 may include the decomposition base B and the decomposition level e of the programmable bootstrapping 450 and the key switching 430. Generally, these parameters can impact the noise of the outputs of the key switching and the programmable bootstrapping: if the noise grows too much, the correctness of the computation can be lost. Moreover, the parameters can affect the computational cost of the operations, in particular of the blind rotation 450. These encrypted computation parameters may be shared among instantiations of the type of subgraph. It is also possible to define multiple subgraph types that have the same structure 400, but have different parameters e.g. for the bootstrapping and/or key switching. This can be implemented for example by representing the bootstrappings and/or key switchings with different parameters as different FHE operations, thus leading to subgraphs of different types.

The computational cost of performing the computation of subgraph 400 may be represented by a cost function, as also discussed elsewhere. In particular, the cost may be obtained by combining the costs of the respective FHE operations, e.g.:

$$\text{Cost}(A(v,t),x) = \text{Cost}(\Sigma(v)x) + \text{Cost}(KS,x) + \text{Cost}(MS,x) + \text{Cost}(BR,x) + \text{Cost}(SE,x).$$

The cost $\text{Cost}(\Sigma(v)x)$ of computing the linear map 420 can, as also explained elsewhere, be based on the corresponding 2-norm, and/or the number of inputs, and/or the number of additions and multiplications. The cost of the linear map can also be approximated to be independent from the particular linear map being applied, thus obtaining a cost function independent from the instantiation parameters.

Optionally, the number of possible values of the decomposition base and level for key switching and/or blind rotation may be reduced by eliminating possible parameter sets that have worse noise and/or complexity than other ones. In particular, a key switch may add a linear noise to the input noise, and a blind rotation may reset input noise, such that in both cases, the noise of the operation may be considered regardless of the input noise. Moreover, for both operations, the computational cost may be increase with bigger levels. Because of this, (base, level) combinations that are worse than others for both the noise and the complexity may be eliminated. This is illustrated by the following procedure:

let $C_{\beta,\ell} = \{\ \}$
for n∈{256, . . . , 2048}
  for N∈{28, . . . , 2¹⁴}
    for k∈{1, . . . , 10}
      for $\beta, \ell \in \{(\beta, \ell) \in \{1, \ldots, 64\}^2 | \beta \cdot \ell \leq \log_2 q\}$
        compute noise of blind rotation $\sigma_{BR}^2$
        store $[\ell_{BR}, \sigma_{BR}^2]$ in $C_{\beta,\ell}$
//remove all ($\beta, \ell$) that always yield worse noise/complexity than some other ($\beta_*, \ell_*$)
for $\ell, \sigma^2 \in C_{\beta,\ell}$
  if $\exists (\ell_*, \sigma_*^2) \in C_{\beta,\ell}$ s.t. $\ell_* < \ell$ and $\sigma_* < \sigma$ then
    remove $(\ell_*, \sigma_*^2)$ from $C_{\beta,\ell}$
$\Omega_{\beta,\ell} = \{(\beta', \ell'')|(l', \sigma_{BR}^2) \in C_{\beta,\ell}\}$ For example, in a concrete case, the number of possible parameter values # $\Omega_{\beta,\ell}$ of a blind rotation may decrease from 280 to 35, and the number of values for a key switching may decrease from 280 to 46.

Figure 4B:
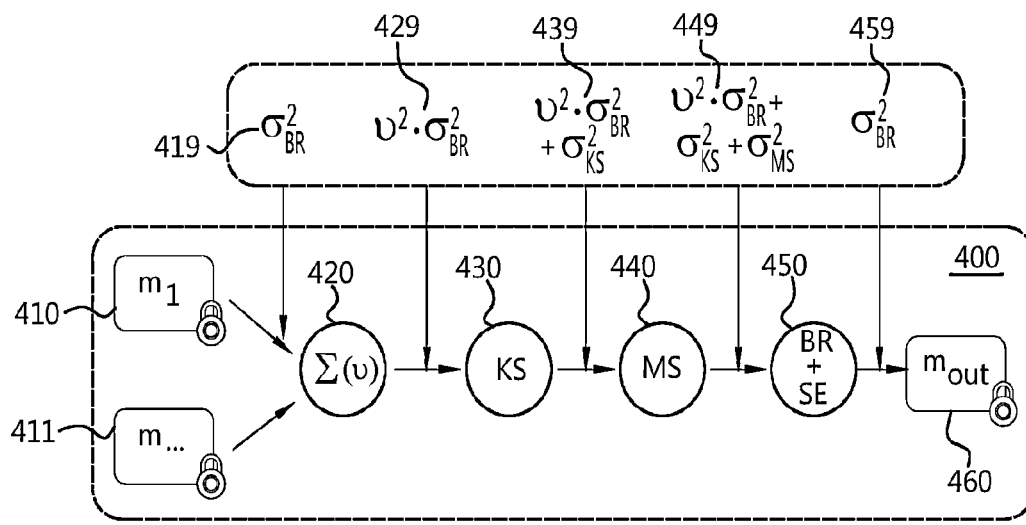
FIG. 4b shows a detailed example of ciphertext noise.
Figure 4B:
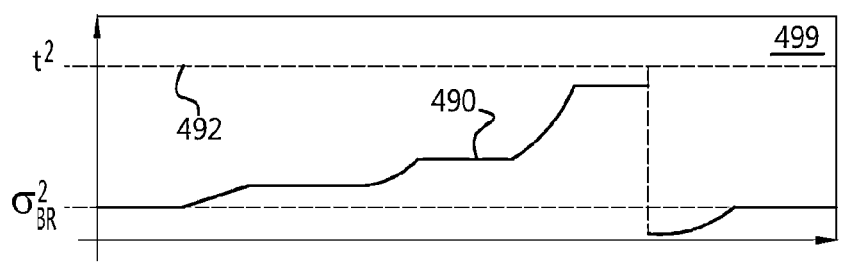

FIG. 4b shows a detailed, yet non-limiting, example of ciphertext noise while evaluating a subgraph of an encrypted computation. In this example, a subgraph of the type illustrated with respect to FIG. 4a is executed. In particular, the figure illustrates a linear map 420 being applied to one or more input ciphertexts 410, 411; followed by a key switching 430; a modulus switching 440; and a blind rotation and sample extraction 450, resulting in an output ciphertext 460.

In particular, as illustrated in the figure, respective FHE operations may have respective noise models defining how the ciphertext noise of the outputs of the FHE operation relates to the ciphertext noise of the inputs. The noise model may in general have the encrypted computation parameters and instantiation parameters for the respective operation as input. In this particular example, the noise model of the linear map 420 may depend on the linear map being applied, and in particular, on the 2-norm v of the linear map being applied. Namely, the noise variance of an output of the linear map 420, $\Sigma(v)$, may be modelled as being equal to the input noise variance multiplied by $v^2$. The noise of the remaining operations of subgraph 400 may depend just on the encrypted computation parameters.

For example, key switching 430 and blind rotation 450 in respective instantiations of the type of subgraph 400 may use the same key switching and bootstrapping keys. Thus, the noise constraint for an instantiation of subgraph 400 may depend just on the instantiation parameters of the subgraph 400, being the 2-norm of the linear map 420 and a noise bound indicating a maximum level that the noise is allowed to reach, of equivalently, indicating a desired precision of the encrypted values; and on the global encrypted computation parameters and/or the encrypted computation parameters for the type of subgraph. Thus, in this example, there are no instantiation-specific encrypted computation parameters. Accordingly, respective instantiations of the illustrated subgraph type may be differentiated by their 2-norm v and noise bound t(p).

As illustrated in the figure, the input ciphertexts of respective instantiations of the subgraph 400 may be assumed to all have the same noise 419, e.g., corresponding to the noise 459 of the output of the blind rotation and sample extraction 450 (and optional rounding). This is in particular the case if the overall computation graph is divided into subgraphs represents subcomputations that result in an output ciphertext with an input-independent noise, e.g., by splitting the computation at programmable bootstrapping (and optional rounding) operations. This is not strictly needed however, e.g., the input noise may be an instantiation parameter.

The ciphertext noise while evaluating the subgraph 400 is illustrated in graph 499. As illustrated by line 490, the noise 429, 439, 449 may in general grow with respective operators of the subgraph, in this case, until reaching its peak 449 after the Modulus Switching 440. The blind rotation and sample extraction 450 then may then result in the output ciphertext 460 having an input-independent noise 459 corresponding to the noise 419 of the inputs of the subgraph. The graph 499 also shows a noise bound 492 for the noise 490, e.g., based on a desired accuracy of the computation. Because the noise increases until the blind rotation and sample extraction 450 is performed, the noise constraint for the subgraph 400 may thus state that the noise 449 of the input to the blind rotation is below the noise bound 492.

Figure 4C:
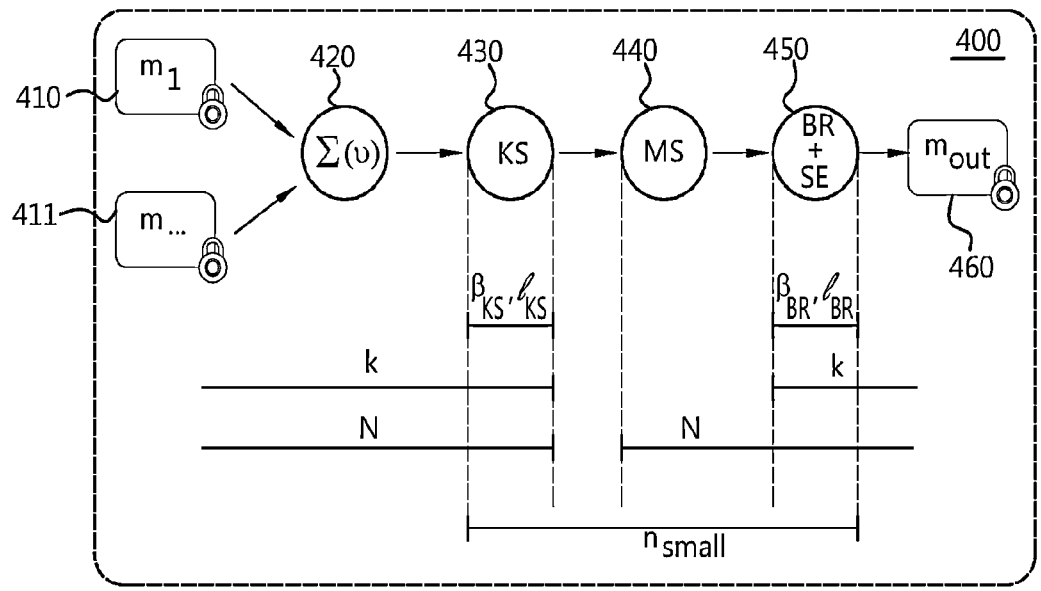
FIG. 4c shows a detailed example of encrypted computation parameters.

FIG. 4c shows a detailed, yet non-limiting, example of encrypted computation parameters. These parameters are here illustrated for the subgraph type 400 also shown in FIGS. 4a and 4b, comprising the linear map 420, the key switching 430, the modulus switching 440, and the blind rotation and sample extraction 450. It will be understood that the same encrypted computation parameters also apply in cases where a different combination and/or order of these operations are used. The figure illustrates, for several encrypted computation parameters, in which part of the subgraph 400 they are used.

In particular, the figure shows the following parameters (with parameters ranges below including the starting and end values):

k: GLWE dimension of output of blind rotation, e.g., an integer having at most or at least 5, at most or at least 10 possible values, e.g., a value between 1 and 10; this may be a global encrypted computation parameter N: GLWE polynomial size of output of blind rotation, e.g., a power of two having at most or at least 5, or at most or at least 10, possible values of the exponent, e.g., a power of two between 28 and $2^{14}$. Sample extraction 450 may result in a LWE ciphertext of dimension k·N. This may be a global encrypted computation parameter;

$n_{small}$: LWE dimension of output of key switching 430, e.g., an integer having at least 100 or at least 1000 possible values, e.g., an integer between 256 and 2048. For efficiency of the optimization, the number of possible values considered may be limited, e.g., $n_{small}$ may be assumed to be a power of two, although this is not needed for the encrypted computation per se. This may be a global encrypted computation parameter;

$\beta_{KS}$: decomposition base of key switching 430, e.g., an integer having at most or at least 32, or at most or at least 64, possible values, e.g., an integer between 1 and 64; this can for example be an encrypted computation parameter specific to subgraph type 400 and possibly shared with one or more other subgraph types, so that the remaining subgraph types can use different values for this parameter;

$\ell_{KS}$: decomposition level of key switching 430, e.g., an integer having at most or at least 32, or at most or at least 64, possible values, e.g., an integer between 1 and 64; this can for example be an encrypted computation parameter specific to subgraph type 400 and possibly shared with one or more other subgraph types, so that the remaining subgraph types can use different values for this parameter;

$\beta_{BR}$: decomposition base of programmable bootstrapping 450, e.g., an integer having at most or at least 32, or at most or at least 64, possible values, e.g., an integer between 1 and 64; this can for example be an encrypted computation parameter specific to subgraph type 400 and possibly shared with one or more other subgraph types, so that the remaining subgraph types can use different values for this parameter;

$\ell_{BR}$: decomposition level of programmable bootstrapping 450, e.g., an integer having at most or at least 32, or at most or at least 64, possible values, e.g., an integer between 1 and 64; this can for example be an encrypted computation parameter specific to subgraph type 400 and possibly shared with one or more other subgraph types, so that the remaining subgraph types can use different values for this parameter.

For example, with the ranges for the parameters discussed above, the number of possible values for the combination of this parameters can be approximately $2^{41}$ highlighting the relevance of an efficient optimization of the parameters.

Figure 5:
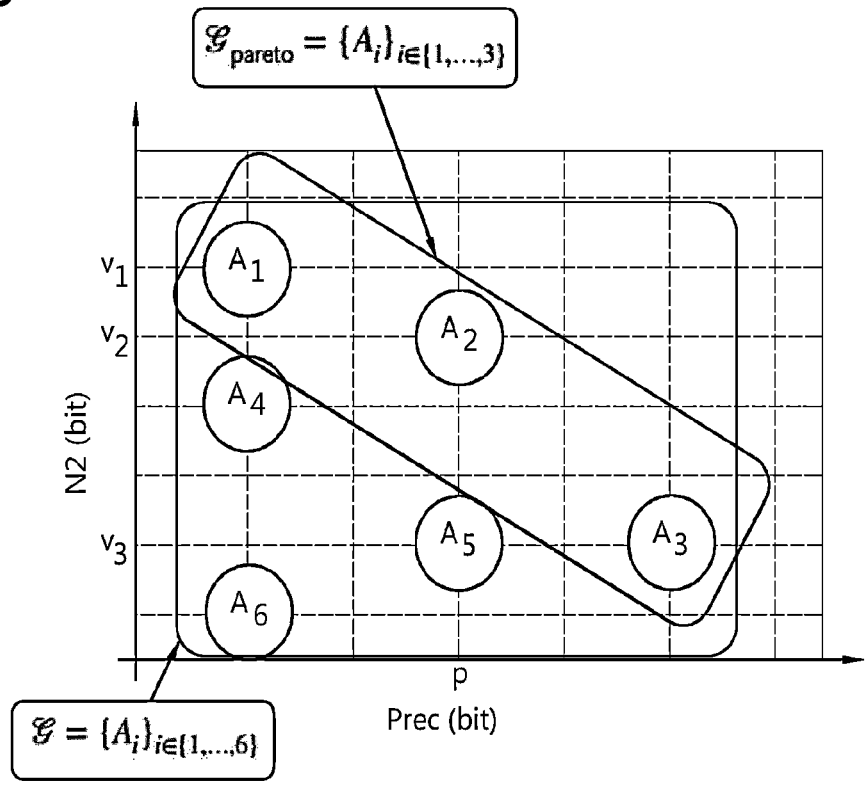
FIG. 5 shows a detailed example of eliminating noise constraints.

FIG. 5 shows a detailed, yet non-limiting, example of eliminating noise constraints. In particular, it is illustrated how it may be determined, based on the instantiation parameters of a first and second subgraph, that a noise constraint for the first subgraph is at least as strict as the noise constraint for the second subgraph. In such a case, the noise constraint for the second subgraph may be eliminated from the optimization of the encrypted computation parameters described herein.

In this example, the subgraphs are parameterized by a noise bound t(p) and by a 2-norm v of an applied linear map, as may be the case for the subgraph types illustrated in FIG. 4a, FIG. 6a, and FIG. 8, for example.

In such a case, it may be noted that if two instantiations of the same subgraph have the same noise bound, then the one with the lower 2-norm in general has less ciphertext noise and so, if the other one satisfies the constraint, this one may do so as well. In the same way, if two instantiations have the same 2-norm and the first one has a higher noise bound, in other words, a noise bound that is easier to satisfy, it may be sufficient to ensure that the noise constraint for the second one is satisfied In other words, the noise constraint may be eliminated if the noise bound of the first subgraph is at most the noise bound of the second subgraph, and the 2-norm of the first subgraph is at least the 2-norm of the second subgraph. Mathematically, let $v_1$, $v_2$ be 2-norms s.t. $v_1 \leq v_2$ and $t_1$, $t_2$ s.t. $t_2 \leq t_1$ the noise bounds, then $\mathcal{S}_\mathbb{N}(A(v_1, t_1)) \subset \mathcal{S}_\mathbb{N}(A(v_2, t_2))$.

For example, in the figure:
subgraph $A_4$ can be eliminated because of subgraph $A_1$ or because of subgraph $A_2$;
subgraph $A_5$ can be eliminated because of subgraph $A_2$ or because of subgraph $A_3$;
subgraph $A_6$ can be eliminated because of subgraph $A_1$, $A_2$, $A_3$, $A_4$, or $A_5$.

Accordingly, the non-eliminated subgraphs in this example may be subgraphs $A_1$, $A_2$, and $A_3$. The set of non-eliminated subgraphs may be referred to as the "Pareto front" for the type of subgraph.

As a consequence of eliminating noise constraints for a number of subgraphs, it may no longer be needed to check the constraints of as many feasible sets as there are subgraphs, but instead, it may be sufficient to check the constraints of the non-eliminated subgraphs. In the example where a subgraph is defined by two instantiation parameters of which at least one has a limited number of values, for example a noise bound and 2-norm, this is particularly beneficial since the number of non-eliminated subgraphs is at most the number of values for that instantiation parameter.

For example, the number of noise bounds, and thus the number of non-eliminated subgraphs for a type of subgraph, may be at most 5 or at most 10.

FIG. 6a shows a detailed, yet non-limiting, example of a type of subgraph 600. Subgraphs of this type may comprise one or more key switchings 620-1, 620-2, 620-3 on respective input ciphertexts 611, 612, 613; a linear map 630; and a programmable bootstrapping applied to the outputs of the linear map, e.g., a modulus switching 640 followed by a blind rotation and sample extraction 650. The output ciphertext 660 may be an output of the sample extraction, to which an optional rounding may be applied as explained elsewhere. Accordingly, the output ciphertext 660 may have noise independent of the noise of input ciphertexts 611-613.

Interestingly, also for the type of subgraph 600, a noise constraint for a second subgraph may be eliminated if the noise bound of a first subgraph is at most the noise bound of the second subgraph and the 2-norm of the first subgraph is at least the 2-norm of the second subgraph. Moreover, interestingly, the subgraph can be of type 600, but can also be of the type 400 illustrated with respect to FIG. 4a.

In particular, the subgraph type 400 of FIG. 4a, e.g., a multisum, a key switch, a modulus switch, a blind rotation and a sample extraction, is also referred to as an "Atomic Pattern of type 1", denoted $A^1$. The subgraph type 600 of the present figure may be referred to as an "Atomic Pattern of type 2", denoted $A^2$. Accordingly, types 400 and 600 may be differentiated in that the KS 620 and the linear map $\Sigma(v)$, 630 are permuted.

For example, an encrypted computation graph $\mathcal{G}$ may be entirely made up of these two types of AP. For the respective types independently, subgraphs may be eliminated as discussed with respect to FIG. 5.

Interestingly, however, it may be possible to further eliminate subgraphs by comparing subgraphs of the two different types of AP 400, 600. More generally, a noise constraint for a second subgraph may be eliminated from the optimization of the encrypted computation parameters by determining that the noise constraint for a first subgraph of a different type is at least as strict.

In particular, for the purpose of elimination, the FHE operators may be divided into three categories regarding the noise:

operators that outputs a noise independent of the input noise, e.g., PBS, WOPBS;

operator that add to the input noise an input-independent noise, e.g., key switch 620, modulus switch 640;

operator that outputs ciphertexts with noise depending on the input noise (e.g., non-linearly), e.g., multisum 630, GLWE Multiplication, etc.

In particular, consider two types of subgraphs in which a FHE operator of type 2 and a FHE operator of type 3 are permuted, as is the case for the multisum 630 and the key switch 620 in subgraph types 400, 600. Note that an FHE Operator that is not of type 1, increases the noise inside the ciphertext. As the FHE Operator of type 3 increases the noise depending on the input noise, the higher the input noise, the higher the output noise.

From this, the following may be concluded. Let $A^1$ and $A^2$ be two types of subgraphs comprising the same operations but differentiated in that in $A^1$, an FHE operator of type 2 is before an FHE operator of type 3 whereas in $A^2$, the same FHE operator of type 2 is after the one of type 3. Then the noise in $A^2$ is higher than the noise in $A^1$. For example, let $A^2$ correspond to subgraph type 600 of FIG. 6a and let $A^1$ correspond to subgraph type 400 of FIG. 4a. Let v be a 2-norm and let t be a noise bound. Then the noise in $A^2$(v, t) is higher than the noise in $A^1(v, t)$ as the noise of the operator of type 2 is amplified by the operator of type 3.

The above example illustrates how a subgraph of one type can be used to eliminate a noise constraint for a subgraph of another type, in particular, in the case where the subgraph types differ by a permutation between an FHE operator of type 2 and one of type 3, in this case, by the KS and the Multisum. In particular, let $v_1$, $v_2$ denote 2-norms s.t. $v_1 \le v_2$ and let $t_1$, $t_2$ denote noise bounds s.t. $t_2 \le t_1$. Then $\mathcal{S}_\mathbb{N}(A^2(v_2, t_2)) \subset \mathcal{S}_\mathbb{N}(A^1(v_1, t_1))$.

More generally, it may be noted that noise constraints may be eliminated regardless of what operations follow the ciphertext with maximal noise, e.g., regardless of what follows a FHE operator of type 1. In particular, subgraph 600 is shown with one operator of type 1, the blind rotation and sample extraction 650. More generally, in a graph with multiple types of subgraph, a further type of subgraph may have one or more different operators of type 1 as final nodes. Since these operators do not affect the maximal noise and thus do not affect the noise constraint, a subgraph of one of the types can be eliminated based a subgraph of another of the types, as described herein.

FIG. 6b shows a detailed, yet non-limiting, example of a type of subgraph 601. Subgraphs of this type may comprise one or more linear maps 621, 622 on one or more input ciphertexts 614, 615; followed by a levelled encrypted multiplication 670; a key switching 631; and a programmable bootstrapping 651. The levelled encrypted multiplication 670 may for example comprise a packing key switch, a tensor product and a relinearization, as known per se, and can also be presented by respective nodes for the respective sub-operations. Similarly, the programmable bootstrapping is in this example represented by a single node 651, but it can also be represented by nodes for its respective sub-operations as for example in FIG. 6a. This type of subgraph may be referred to as an "Atomic Pattern of type 3", denoted $A^3$.

Accordingly, subgraph type 601 may be based on subgraph type 400, additionally including the multiplication 670. Similarly, a fourth subgraph type may be defined that is based on subgraph type 600 of FIG. 6a and additionally includes the encrypted multiplication between the linear map 630 and modulus switching 640.

Interestingly, a subgraph of the first type may be eliminated based on a subgraph of the third type, and similarly, a subgraph of the second type may be eliminated based on subgraph of the fourth type. More generally, a subgraph of a certain type may be eliminated based on a subgraph of that type with an additional levelled encrypted multiplication. Indeed, the levelled encrypted multiplication adds additional noise and thus leads to a stricter noise constraint.

For example, let $A^1(v, t)$ be a subgraph of the first type and let $A^3(v_1, v_2, t)$ be a subgraph of the third type. If $v^2 < v_1^2 + v_2^2$, then $A^3(v_1, v_2, t)$ dominates $A^1(v, t)$ so the latter can be eliminated.

Figures 7A, 7B:
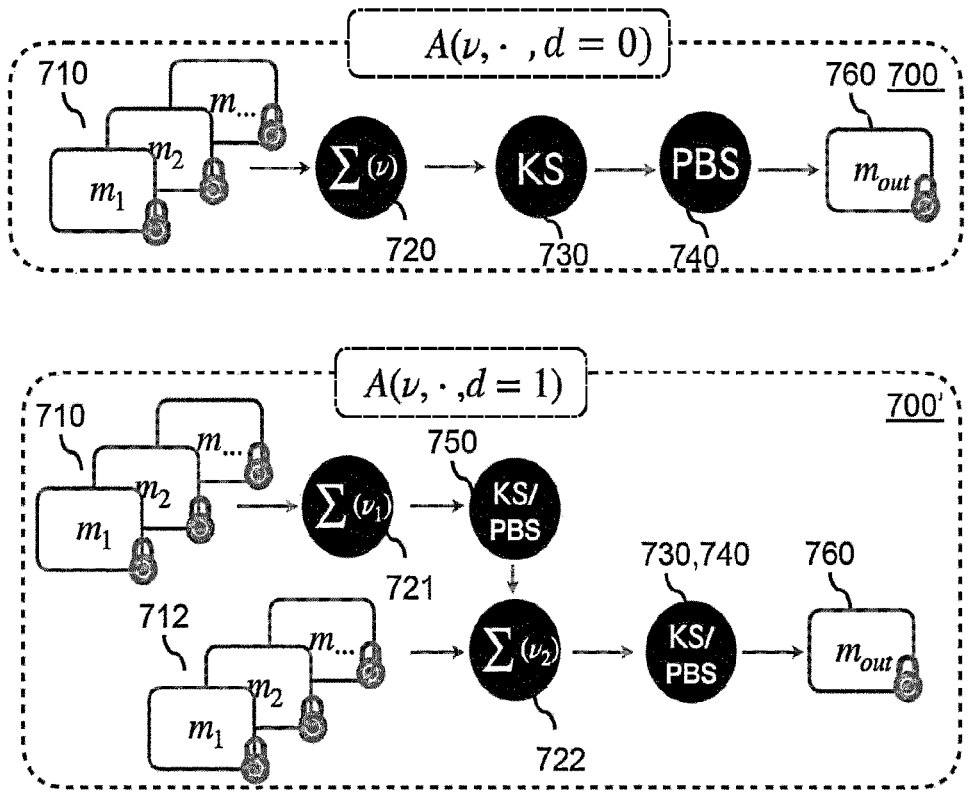
FIG. 7a shows a detailed, yet non-limiting, example of determining a key switching and/or bootstrapping key to be used.
FIG. 7b shows a detailed example of determining a number of programmable bootstrappings.

FIG. 7a shows a detailed, yet non-limiting, example of identifying respective key switching and/or bootstrapping keys to be used for respective subgraphs.

As also discussed elsewhere, key switching keys and bootstrapping keys may be specific to a particular set of encrypted computation parameters, e.g., level and decomposition key parameters. As discussed with respect to FIG. 4a, these parameters may be shared between different instantiations of the same type of subgraph. In particular, in some cases, the same key switching and/or bootstrapping keys may be used throughout the encrypted computation. This has as an advantage that it leads to small key material, but on the other hand, it can negatively impact computational complexity, because, in this case, it is not possible to use a noisier and faster key switching or bootstrapping in subgraphs where this is possible.

There are several ways to support multiple key switching and/or bootstrapping keys in the same encrypted computation. As also discussed with respect to FIG. 4a, one way is to define respective types of subgraph that have the same structure but use respective key switching and/or bootstrapping keys, where a specific subgraph is preconfigured to have a particular type. A disadvantage of this approach is that it is not possible to automatically optimize which key is used in which subgraph.

Another approach is to define the cryptographic parameters of the key switching and/or bootstrapping (e.g., level/base) as encrypted computation parameters for a particular instance of the subgraph, as opposed to for the type of subgraph. The number of different keys used in the computation can in such a case be limited by including this as a constraint in the optimization. However, this approach leads to a large amount of additional parameters, making the optimization problem much more complex.

Interestingly, the inventors envisaged a better way of automatically determining which key switching and/or bootstrapping keys to use in which subgraph. Namely, multiple sets of parameters (e.g., level and/or base) corresponding to multiple sets of key switching and/or bootstrapping keys may be defined, for example, as part of the global encrypted computation parameters or as parameters for a given type of subgraph may comprise. The number of sets to be used may be preconfigured. For a given subgraph 770-772, an encrypted computation parameter 8, 780-782 of that subgraph may identify which set of parameters is used in the subgraph.

This is illustrated for key switching below. Assuming the number of key switching key to use is X and the number of subgraphs using them is Y. The optimization of the key switching key to use may correspond to determining, $\forall i \in [1, Y], \delta_i \in [1, X]$, leading to an additional a search space of size $X^Y$. This is better than having respective parameter sets for respective subgraphs, but still significant.

Interestingly, the inventors realized that the search space for identifying the key switching key (and similarly for the bootstrapping key) can be greatly reduced by, if a noise constraint for a first subgraph is at least as strict as a noise constraint for a second subgraph, constraining the key switching key for the first subgraph to add at most as much noise as the key switching key for the second subgraph.

In particular, the key switching keys to be used may be ordered according to their amount of added noise, e.g., as a sequence ($KSK_0$, $KSK_1$, ...) such that $KSK_0$ adds less noise than $KSK_1$ that adds less noise than $KSK_2$ and so on. In such a case, typically, a key switch with $KSK_0$ is computationally more costly than a key switch with $KSK_1$, leading to a trade-off between cost and noise.

As an example, consider multiple subgraphs (e.g., of type 1 or 2 as discussed herein) with the same noise bound t and different 2-norms, $\mathcal{G} = \{A(v_0, t), A(v_1, t), A(v_2, t)\}$, 770-772, s.t. $v_0 < v_1 < v_2$. Further, consider two key switching keys $KSK_0$ and $KSK_1$ such that $KSK_1$ adds more noise during the key switch than $KSK_0$. The key switching keys to be used in respective subgraphs may be represented by parameters ($\delta_0$, $\delta_1$, $\delta_2$), $\delta_i \in \{0,1\}$, 780-782.

In this example, note that ($\delta_0$, $\delta_1$, $\delta_2$)=(0, 1, 0) cannot be the optimal solution. This can be reasoned as follows. As discussed with respect to FIG. 4a and FIG. 6a, in this case, $S_\mathbb{N}(A(v_2, t)) \subset S_\mathbb{N}(A(v_1, t)) \in S_\mathbb{N}(A(v_0, t))$. That means that a feasible solution for $A(v_0, t)$ is a feasible solution for $A(v_1, t)$.

Assume that $(\delta_0, \delta_1, \delta_2) = (0, 1, 0)$ is the optimal solution. Moreover, the noise constraint for $A(v_0, t)$ can be eliminated from the optimization because the noise constraint for $A(v_2, t)$ is at least as strict.

Now, consider at the solution $(\delta_0, \delta_1, \delta_2) = (1, 1, 0)$. In this case, the noise constraint for $A(v_0, t)$ can be eliminated from the optimization because the noise constraint for $A(v_1, t)$ is at least as strict.

As a consequence, with $\mathcal{G}_{010} = \mathcal{G}$ with $(\delta_0, \delta_1, \delta_2) = (0, 1, 0)$ and $\mathcal{G}_{110} = \mathcal{G}$ with $(\delta_0, \delta_1, \delta_2) = (1, 1, 0)$:

$(\delta_0, \delta_1, \delta_2)$ can be equal to $(0, 1, 0)$ or $(1, 1, 0)$, in any case, the resulting $S_\mathbb{N}(\bullet)$ is the same: $S_\mathbb{N}(\mathcal{G}_{010}) = S_\mathbb{N}(\mathcal{G}_{110})$ $\forall x \in \varepsilon \cap S_\mathbb{N}(\mathcal{G}_{010})$, $\text{Cost}(\mathcal{G}_{010}, x) > \text{Cost}(\mathcal{G}_{110}, x)$ as the only difference between $\mathcal{G}_{010}$ and $\mathcal{G}_{110}$ is that the first one uses a slower keyswitch. As the feasible sets are the same, and $\mathcal{G}_{010}$ is always worse in term of computational complexity than $\mathcal{G}_{110}$, it is concluded that $(\delta_0, \delta_1, \delta_2) = (0, 1, 0)$ cannot be the optimal solution.

The above reasoning may be extended to a graph with an arbitrary number of subgraphs with the same noise bound. In such a case, identifying respective key switching keys may correspond to determining the number of most noise-constrained subgraphs that use the first key switching key, with the remaining subgraphs using the second key switching key. This greatly reduces the parameter space. Mathematically, let $\mathcal{G} = \{A(v_i, t)\}_{i \in I}$ s.t. $v_0 < v_1 < v_2 < \ldots < v_Y$ and $Y = |I|$, and assume 2 key switching keys are used. Then the optimal $\delta = (\delta_0, \ldots, \delta_Y)$ is of the form $(1, \ldots, 1, 0, \ldots, 0)$. Thus, the optimization does not need to find every possible, $\{S\} \in E$, e.g., it may suffice to determine $\gamma \in \{1, \ldots, Y\}$ s.t. $\delta = (1, \ldots 1, 1, 0, \ldots, 0)$ with $\gamma = i$ s.t. $\delta_{i-1} = 1$ and $\delta_i = 0$. This means that instead of having to search in a search space of size $2^Y$, it can suffice to search in a space of size Y.

The above reasoning also applies with an arbitrary number of key switching keys. Also in this case, it may suffice to determine a number of subgraphs (ordered from most strict to least strict noise constraints) that use the respective key switching keys. Mathematically, let $\mathcal{G} = \{A(v_i, t)\}_{i \in I}$ s.t. $v_0 < v_1 < v_2 < \ldots < v_Y$ and $Y = |I|$, and assume a number X key of switching keys. Then the optimal $\delta = (\delta_0, \ldots, \delta_Y)$ is of the form $(Y, \ldots, Y, Y-1, \ldots, Y-1, \ldots, 1, \ldots, 1, 0, \ldots, 0)$. As a consequence, it is not necessary to find every possible $\{\delta_i\}_{i \in I}$, e.g., it may suffice to determine $\{\gamma_j\}_{j \in [[1, X-1]]}$ s.t. $\gamma_j \in [[1, Y]]$, $\gamma_j = i$ with $\delta_{i-1} = x \in [[1, X-1]]$ and $\delta_i = x+1$, and moreover, $\gamma_0 < \gamma_1 < \ldots$ . This means that instead of having to search in a search space of size $X^Y$, it can suffice to search in a space of size $$\approx \frac{Y^{X-1}}{(X-1)!}.$$

The above approach can be applied to respective sets of subgraphs that share respective noise bounds by defining respective key identifier vectors $(\delta_0, \ldots, \delta_Y)$ for the respective sets of subgraphs as described above.

Moreover, the above approach can also be applied to identify respective bootstrapping keys to use in respective subgraphs, where the bootstrapping keys are ordered according to the amount of added noise.

It is also possible, for a given subgraph, to determine both a key switching and a bootstrapping key to be used. In such a case, if a noise constraint for a first subgraph is at least as strict as a noise constraint for a second subgraph, then the key switching and bootstrapping keys for the first subgraph may be constrained such that they do not both add more noise than the key switching and bootstrapping keys for the second subgraph. For example: let $v_1 > v_2$ and t a noise bound and $\delta_1^{BSK}$, $\delta_1^{KSK}$ (respectively $\delta_2^{BSK}$, $\delta_1^{KSK}$) the identification of which key to use for $A(v_1, t)$ (respectively for $A(v_2, t)$). In this case, solutions where $\delta_1^{BSK} > \delta_2^{BSK}$ and $\delta_1^{KSK} > \delta_2^{KSK}$ are sub-optima and thus can be eliminated.

FIG. 7b shows a detailed, yet non-limiting, example of determining a number of programmable bootstrappings to be performed during the application of a linear map. The example in this figure is based on the type of subgraph of FIG. 4a, but the techniques apply equally to other types of subgraph that comprise an application of a linear map, such as the type of subgraph shown in FIG. 6a.

Shown in the figure is a subgraph 700 of the type illustrated with respect to FIG. 4a, comprising a linear map 720 applied to one or more input ciphertexts 710; followed by a key switching 730; and a programmable bootstrapping 740 (in this case shown as a single node, but typically implemented as a modulus switching; blind rotation; and sample extraction), resulting in an output ciphertext 760.

Further shown is a different subgraph 700' that computes the same output ciphertext 760 from the same input ciphertexts 710, but does so by using a programmable bootstrapping 750 during the application of the linear map, which is in this case divided into two parts 721, 722. The inserted programmable bootstrapping 750 in this example applies the identity function, although it could also e.g. incorporate a scalar multiplication and/or addition of a public value. As in subgraph 700, a key switching and programmable bootstrapping 730 (illustrated here for brevity as a single node) are applied to the output of the linear map 721-722 to obtain the output ciphertext.

By inserting PBS 750 in the subgraph, in this case during the application of the linear map, computational complexity may increase. On the other hand, ciphertext noise while evaluating the subgraph is reduced by the PBS 750, in this case reducing the 2-norm of the multisum 721, 722 and thus allowing to have noisier, but faster, parameters.

Interestingly, the inventors realized that it is possible to optimize for this trade-off and thereby automatically determine, for respective subgraphs of a given type, respective numbers of programmable bootstrappings to be performed during the subgraph, e.g., as in this example, during the application of the respective linear map. Accordingly, subgraph types may be defined that have a variable number of programmable bootstrappings d. For example, the computation graph of the encrypted computation that is input to the optimization may not comprise programmable bootstrappings during the application of respective linear maps, where the optimization inserts those programmable bootstrappings as appropriate.

Mathematically, the optimization problem may in this case be phrased as:

$$\text{argmin}_{d \in \mathcal{D}} \text{Cost}(\mathcal{G}, x) \text{ s.t. } \mathcal{G} = \{A(v_i, t, d_i)\}_i$$

$$\bar{x} = \text{argmin}_{x \in \varepsilon} \text{Cost}(\mathcal{G}, x) \text{ s.t. } x \in S_\mathbb{N}(\mathcal{G}).$$

When it is determined to perform one or more programmable bootstrappings during the linear map, the linear map may be automatically split into a number of respective linear maps corresponding to the number of programmable bootstrappings. This can be done by minimizing a maximal 2-norm of the respective linear maps, e.g., $v_1 \approx v_2$. This way, the insertion of the programmable bootstrapping is most effective in allowing more noisy parameters.

In particular, the linear map may be split by minimizing the maximum two-norm of the respective linear maps. This provides a good approximation of the optimal solution in terms of noise and complexity by effectively neglecting the multisum cost (and in particular, the number of inputs that the respective multisums are applied to). In particular, to split the multisum into two multisums, as in subgraph 700', the following optimization problem may be solved, e.g., using an appropriate solver known per se:

$$\min_{w_{i,1},\Lambda} \max(v_1, v_2) \text{ s.t. } w_i = w_{i,1}\Lambda + w_{i,2}$$

$$PGCD(w_{i1}, \Lambda) = 1$$

$$\forall j \in \{1, 2\}, v_j = \sqrt{\sum_i w_{j,1}^2}$$

Here, $\Lambda$ is an optional further integer output of the optimization. As another example, a multisum may be split in three using the following optimization:

$$\min_{w_{i,1},\Lambda_1,\Lambda_2} \max(v_1, v_2, v_3) \text{ s.t. } w_i = w_{i,1}\Lambda_1 + w_{i,2}\Lambda_2 + w_{i,3}$$

$$\forall j \in \{1, 2\}, PGCD(w_{i1}, \Lambda_j) = 1.$$

$$\forall j \in \{1, 2\}, v_j = \sqrt{\sum_i w_{j,1}^2}$$

Another technique for splitting the multisum is as follows. This technique is particularly effective if the weights are close to uniformly distributed, e.g., $w_i \in [-2^p, 2^p]$. According to this technique, respective weights may be radix-decomposed into digits and the digits may be applied to the input and combined. For example, the radix decomposition can be as in Algorithm 1 of I. Chillotti et al., "Faster Fully Homomorphic Encryption: Bootstrapping in less than 0.1 seconds", proceedings ASIACRYPT 2016 (incorporated herein by reference), or using a signed decomposition as disclosed in M. Joye, "Balanced non-adjacent forms", proceedings ASIACRYPT 2021 (incorporated herein by reference). In particular, the level of the radix decomposition may be equal to d+1 with d the number of programmable bootstrappings to be applied, and the base log may be set of $$\frac{p+1}{d+1}.$$

Respective $\Lambda_i$ may be respective powers of base B.

Interestingly, in determining the numbers $d_i$ of programmable bootstrappings to perform for respective subgraphs i, the parameter space of the di may be greatly reduced by, if a noise constraint for a first subgraph i is at least as strict as a noise constraint for a second subgraph j, constraining the number of programmable bootstrappings di for the first subgraph to be greater than or equal to the number of programmable bootstrappings $d_j$ for the second subgraph.

Namely, if inserting a PBS in the subgraph does not change the parameters, the insertion is always sub-optimal. More precisely, let $\mathcal{G} = A(v_i, t)$ s.t. $v_0 < v_1 < \ldots$ Let $d^* = (d^*_1, \ldots)$ and $\tilde{d} = (\tilde{d}_1, \ldots)$ be two possible solutions. Let $\mathcal{G}^* = \{A(v_i, t, d^*_i)\}$ and $\tilde{\mathcal{G}} = \{A(v_i, t, \tilde{d}_i)\}$. If $\tilde{d}^* \leq \tilde{d}$, e.g., every coordinate is inferior or equal and $\mathcal{S}_\mathbb{N}(\mathcal{G}^*) = \mathcal{S}_\mathbb{N}(\tilde{\mathcal{G}})$, then it may be noted that $\tilde{d}$ cannot be the optimal solution. Namely, similarly to the discussion of FIG. 7a, the noise feasible set of those two subgraphs is the same and the cost of one subgraph is higher than the other as it contains more programmable bootstrappings.

FIG. 8 shows a detailed, yet non-limiting, example of a programmable bootstrapping with noise rounding. This example can be combined with any subgraph type that comprises a programmable bootstrapping, e.g., the subgraph type of FIG. 4a, FIG. 6a, FIG. 6b, or FIG. 7b.

In particular, this example shows a programmable bootstrapping comprising a modulus switch 840 applied to an input ciphertext 839 of the programmable bootstrapping, resulting in a LWE-encrypted modulus switching output 849; followed by a blind rotation 851 using a bootstrapping key 854 and a lookup table 855, resulting in a GLWE-encrypted monomial 852 (in this example, an RLWE encryption), to which a sample extraction 853 is applied to obtain a LWE-encrypted output ciphertext 869 of the programmable bootstrapping. These operations may be performed as known per se.

Interestingly, as shown in this figure, a noise rounding operation 870 may be applied to the sample extraction output 869 to obtain a rounded output ciphertext 879. In particular, the operation may set a given number of least significant bits of the ciphertext values to zero, or, in other words, round the ciphertext values to a given power of two. It is noted that the output ciphertext 869 typically has input-independent noise, and therefore the rounded output ciphertext 879 has input-independent noise as well. As the inventors realized, by applying a rounding operation to the result of the programmable bootstrapping, it is possible to make the rounded result 879 of the programmable bootstrapping independent of the particular Fast Fourier Transform (FFT) implementation used to implement the programmable bootstrapping, as long as the FFT implementation has a given accuracy. Thereby, the PBS may effectively become deterministic. This may result in, or at least contribute to, the full encrypted computation becoming deterministic.

Namely, the inventors realized that the output 869 of the sample extraction before the rounding 870, may differ between FFT implementations. This was indeed observed in an experiment where an implementation of the PBS on a CPU with FFTW was compared against an implementation on a GPU with a custom FFT. Although both outputs are per se correct, they may differ in terms of the exact output noise that is produced. For many coefficients of the output of a PBS, it was observed that the most significant bits, containing the message, were the same, while the least significant bits (containing the noise), contained some differences.

It is possible to preconfigure the number of bits to which the rounding is applied, in other words, the place where to do the rounding, but it is also possible to determine this place as an encrypted computation parameter, e.g., a global encrypted computation parameter or a parameter specific to a type of subgraph. Namely, the rounding may add an amount of noise, where, the higher in the MSB the rounding is applied, the more noise is added to the plaintext. For given implementation(s) of the FFT, the optimization may use a limit in terms of error in the ciphertext's coefficients that the implementation(s) introduce. The encrypted computation parameters may then be optimized taking into account the FFT error model in addition to the noise and cost model.

To take into account the error of the FFT depending on the implementation, a constraint can be included in the optimization of the encrypted computation parameter. This constraint may be represented by an additional feasible set $S_{other}(\mathcal{G})$ that is taken into account in the optimization. The condition may be represented as:

$$S_{other}(\mathcal{G}) = \{x \in \varepsilon | \forall i, \mathbb{E}_{\mathcal{O}_i(x)} = 0\} \subset \varepsilon,$$

with $\mathbb{E}_{\mathcal{O}_i}(x)$ the error of the output ciphertext's coefficients of $\mathcal{O}_i$.

Generally, this approach may be based on a model for the error in the output of an FHE operator in terms of ciphertext's coefficients. For instance, a FHE operator that does use the FFT may take as input an error-free ciphertext and may output an error-free ciphertext.

The programmable bootstrapping, or more generally, an FHE operator that uses the FFT, may either reset the error to a minimal level, e.g., may result in a ciphertext that is not error-free, or may output a maximum amount of error, e.g., a re-randomization of the ciphertext, depending on the parameters for the operator, and the input error. The rounding may keep the same amount of error or may cancel the error, depending on the encrypted computation parameters and the input error.

The FFT error may be constrained based on other cryptographic and/or encrypted computation parameters, e.g., by requiring that $$\frac{q}{2\beta_{PBS}^{\ell_{PBS}}} > \text{error}_{FFT}(x).$$

Although in the above example, the noise rounding 870 is applied to the output of a programmable bootstrapping, it is noted that, more generally, the noise rounding may be applied to outputs of other FHE operations that use the FFT, or in general, other FHE operations that result in implementation-dependent noise, thus contributing to making the encrypted computation act deterministically on ciphertexts.

It is also noted that noise rounding 870 can be applied to make the encrypted computation more deterministic, regardless of whether or not encrypted computation parameters are determined by an optimization as described herein. In particular, the inventors envisage a cryptographic method of performing an encrypted computation, and a corresponding encrypted computation device, wherein a noise rounding operation 870 is applied to an output of a FHE operation that contains implementation-dependent noise, such as the FFT-dependent noise of a programmable bootstrapping 840-853. The encrypted computation performed by this method and device may use encrypted computation parameters as described herein, but this is not needed.

In particular, the cryptographic method of performing the encrypted computation comprising the noise rounding, may be performed by a mining device of a distributed ledger, for example, a blockchain. In particular, multiple such mining devices may perform the encrypted computation. Because of the use of rounding 870, it may be achieved that the respective mining devices compute the exact same ciphertext as output of the encrypted computation, meaning that not only the plaintext is the same, but also the ciphertext encrypting the plaintext. When used in combination with the optimization described herein, still, it is possible for respective mining devices to use respective encrypted computation parameters that are optimal for the implementation-dependent noise, e.g., the FFT error, of their respective system configurations. In particular, by using rounding 870, the miners may achieve consensus on the encrypted computation output without the need for decryption.

The following numbered clauses include examples that are contemplated and non-limiting:

1. A computer-implemented method (900) of determining encrypted computation parameters for carrying out an encrypted computation on noisy ciphertexts, comprising:
   accessing (910) data representing a computation graph of the encrypted computation;
   obtaining (920) a division of the computation graph into multiple subgraphs, wherein a subgraph is defined by a type from a set of one or more types, and by zero or more instantiation parameters for the type;
   defining (930) respective sets of encrypted computation parameters for the respective types;
   performing (940) an optimization of the encrypted computation parameters, wherein:
   the encrypted computation parameters are optimized to minimize a computational cost of carrying out the encrypted computation according to the encrypted computation parameters; and
   the encrypted computation parameters are constrained to satisfy a noise constraint on ciphertext noise while carrying out the encrypted computation, wherein the noise constraint is based on respective noise constraints for respective subgraphs, wherein a noise constraint for a subgraph of a given type is defined by a noise constraint function for the given type that takes at least the encrypted computation parameters for the given type and the instantiation parameters of the subgraph as input.

2. The method (900) of clause 1, comprising:
   determining, based on the instantiation parameters of a first and second subgraph, that the noise constraint for the first subgraph is at least as strict as the noise constraint for the second subgraph; and
   eliminating the noise constraint for the second subgraph from the optimization.

3. The method (900) of clause 2, wherein the first and second subgraph are parameterized by a noise bound and by a 2-norm of an applied linear map, and wherein noise bound of the first subgraph is at most the noise bound of the second subgraph and the 2-norm of the first subgraph is at least the 2-norm of the second subgraph.

4. The method (900) of any preceding clause, wherein the computational cost is minimized based on a cost function, wherein the cost function is based on respective costs for respective subgraphs, wherein a cost for a subgraph of a given type is defined by a cost function for the given type that takes at least the encrypted computation parameters for the given type as input and is independent from the instantiation parameters.

5. The method (900) of any preceding clause, wherein a subgraph represents a subcomputation resulting in an output ciphertext with an input-independent noise.

6. The method (900) of any preceding clauses, wherein the encrypted computation parameters comprise one or more of: a decomposition base of a programmable bootstrapping, a decomposition level of a programmable bootstrapping, a decomposition base of a key switching, and a decomposition level of a key switching.

7. The method (900) of any preceding clause, wherein a subgraph comprises a programmable bootstrapping resulting in an output ciphertext, and a noise rounding of the output ciphertext.

8. The method (900) of any preceding clause, wherein the optimization of the encrypted computation parameters is performed by branch-and-bound.

9. The method (900) of any preceding clause, wherein the encrypted computation parameters identify respective key switching and/or bootstrapping keys to be used for respective subgraphs, wherein, if a noise constraint for a first subgraph is at least as strict as a noise constraint for a second subgraph, the key switching and/or bootstrapping key for the first subgraph is constrained to add at most as much noise as the key switching and/or bootstrapping key for the second subgraph.

10. The method (900) of any preceding clause, wherein the encrypted computation parameters indicate, for respective subgraphs in which respective linear maps are applied, a respective number of programmable bootstrappings to be performed during the application of the respective linear map.

11. The method (900) of clause 10, further comprising splitting the linear map into a number of respective linear maps corresponding to the number of programmable bootstrappings by minimizing a maximal 2-norm of the respective linear maps.

12. The method (900) of clause 10 or 11, wherein, if a noise constraint for a first subgraph is at least as strict as a noise constraint for a second subgraph, the number of programmable bootstrappings for the first subgraph is constrained to be greater than or equal to the number of programmable bootstrappings for the second subgraph.

13. The method (900) of any preceding clause, further comprising:
    transforming an unencrypted computation graph into the computation graph of the encrypted computation; and/or
    compiling the computation graph of the encrypted computation into a set of instructions for an encrypted computation engine; and/or
    carrying out the encrypted computation according to the determined encrypted computation parameters.

14. A configuration device (110) for determining encrypted computation parameters for carrying out an encrypted computation on noisy ciphertexts, comprising:
    a storage (130) for storing data representing a computation graph of the encrypted computation;
    a processor subsystem (140) configured to:
        obtain a division of the computation graph into multiple subgraphs, wherein a subgraph is defined by a type from a set of one or more types, and by zero or more instantiation parameters for the type;
        define respective sets of encrypted computation parameters for the respective types;
        perform an optimization of the encrypted computation parameters, wherein: the encrypted computation parameters are optimized to minimize a computational cost of carrying out the encrypted computation according to the encrypted computation parameters; and the encrypted computation parameters are constrained to satisfy a noise constraint on ciphertext noise while carrying out the encrypted computation, wherein the noise constraint is based on respective noise constraints for respective subgraphs, wherein a noise constraint for a subgraph of a given type is defined by a noise constraint function for the given type that takes at least the encrypted computation parameters for the given type and the instantiation parameters of the subgraph as input.

15. A transitory or non-transitory computer-readable storage medium (1000) comprising data (1020) representing instructions which, when executed by a processor system, cause the processor system to perform the method according to any one of clauses 1-13; and/or encrypted computation parameters and/or instructions for an encrypted computation engine determined according to the method of any one of clauses 1-13.

Figure 9A:
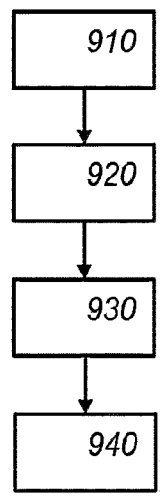
FIG. 9a schematically shows an example of an embodiment of a method of determining encrypted computation parameters.

FIG. 9a schematically shows an example of an embodiment of a computer-implemented method 900 of determining encrypted computation parameters for carrying out an encrypted computation on noisy ciphertexts.

The method 900 may comprise accessing 910 data representing a computation graph of the encrypted computation.

The method 900 may comprise obtaining 920 a division of the computation graph into multiple subgraphs. A subgraph may be defined by a type from a set of one or more types, and by zero or more instantiation parameters for the type.

The method 900 may comprise defining 930 respective sets of encrypted computation parameters for the respective types.

The method 900 may comprise performing 940 an optimization of the encrypted computation parameters. In the optimization, the encrypted computation parameters may be optimized to minimize a computational cost of carrying out the encrypted computation according to the encrypted computation parameters. Further, the encrypted computation parameters may be constrained to satisfy a noise constraint on ciphertext noise while carrying out the encrypted computation. The noise constraint may be based on respective noise constraints for respective subgraphs. A noise constraint for a subgraph of a given type may be defined by a noise constraint function for the given type that takes at least the encrypted computation parameters for the given type and the instantiation parameters of the subgraph as input.

Figure 9B:
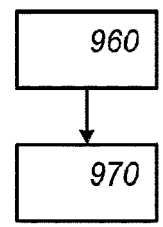
FIG. 9b schematically shows an example of an embodiment of a cryptographic method of performing an encrypted computation.

FIG. 9b schematically shows an example of an embodiment of a cryptographic method 950 of performing an encrypted computation.

The method 950 may comprise obtaining 960 encrypted computation parameters as described herein, and performing 970 the encrypted computation according to the obtained encrypted computation parameters. For example, the encrypted computation parameters may be incorporated into a set of obtained instructions for an encrypted computation engine that performs 970 the encrypted computation, or the encrypted computation parameters 960 may be obtained separately from a representation of the encrypted computation to be performed.

Instead or in addition to using encrypted computation parameters as described herein, the method 950 may apply a noise rounding operation to a ciphertext that has implementation-dependent noise, e.g., an output of a programmable bootstrapping, e.g., as discussed with respect to FIG. 8.

Many different ways of executing the method(s) 900, 950 are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started. It is also possible to combine the methods 900, 950, e.g., method 950 of performing an encrypted computation may be performed according to encrypted computation parameters previously determined according to method 900.

Embodiments of the methods may be executed using software, which comprises instructions for causing a processor system to perform method 900 or 950. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Typically, the devices described herein, e.g., in FIG. 1a-1c, comprise one or more microprocessors which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, the systems may comprise circuits for the evaluation of cryptographic primitives.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 10:
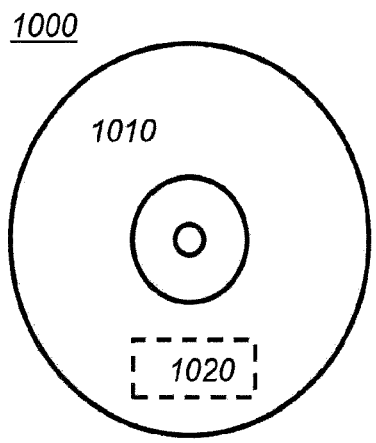
FIG. 10 schematically shows a computer readable medium having a writable part according to an embodiment.

FIG. 10 shows a computer readable medium 1000 having a writable part 1010. Computer readable medium 1000 is shown in the form of an optically readable medium. Computer readable medium 1000 may store data 1020 wherein the data may indicate instructions, which when executed by a processor system, cause a processor system to perform an embodiment of a method of determining encrypted computation parameters, and/or of performing an encrypted computation, according to an embodiment.

Instead or in addition, the data 1020 may represent encrypted computation parameters and/or instructions for an encrypted computation engine determined according to an embodiment.

The data 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable.

Figure 11:
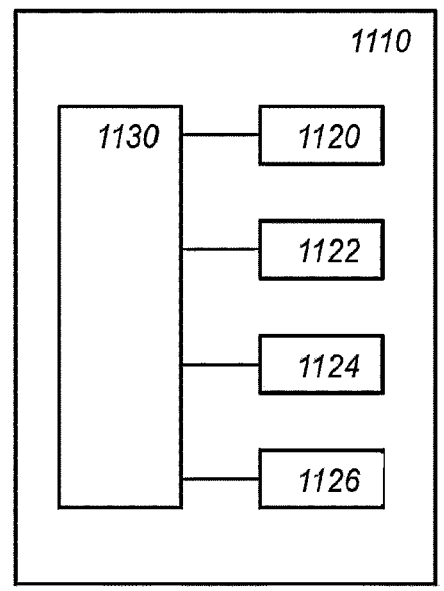
FIG. 11 schematically shows a representation of a processor system according to an embodiment.

FIG. 11 shows in a schematic representation of a processor system 1140 according to an embodiment of a device for performing an encrypted computation or determining encrypted computation parameters. The processor system comprises one or more integrated circuits 1110. The architecture of the one or more integrated circuits 1110 is schematically shown in the figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the device for performing the encrypted computation or compilation, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1110 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1110 is implemented in a cloud computing system, the various hardware components may belong to separate physical systems. For example, the processor 1120 may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computer-implemented method (900) of determining encrypted computation parameters for carrying out an encrypted computation on noisy ciphertexts, comprising:
   accessing (910) data representing a computation graph of the encrypted computation;
   obtaining (920) a division of the computation graph into multiple subgraphs, wherein a subgraph represents a subcomputation resulting in an output ciphertext with an input-independent noise, and is defined by a type from a set of one or more types, and by zero or more instantiation parameters for the type;
   defining (930) respective sets of encrypted computation parameters for the respective types;
   performing (940) an optimization of the encrypted computation parameters, wherein:
      the encrypted computation parameters are optimized to minimize a computational cost of carrying out the encrypted computation according to the encrypted computation parameters; and
      the encrypted computation parameters are constrained to satisfy a noise constraint on ciphertext noise while carrying out the encrypted computation, wherein the noise constraint is based on respective noise constraints for respective subgraphs, wherein a noise constraint for a subgraph of a given type is defined by a noise constraint function for the given type that takes at least the encrypted computation parameters for the given type and the instantiation parameters of the subgraph as input,
   determining, based on the instantiation parameters of a first and second subgraph, that the noise constraint for the first subgraph is at least as strict as the noise constraint for the second subgraph; and
   eliminating the noise constraint for the second subgraph from the optimization.

2. The method (900) of claim 1, wherein the first and second subgraph are parameterized by a noise bound and by a 2-norm of an applied linear map, and wherein noise bound of the first subgraph is at most the noise bound of the second subgraph and the 2-norm of the first subgraph is at least the 2-norm of the second subgraph.

3. The method (900) of claim 1, wherein the computational cost is minimized based on a cost function, wherein the cost function is based on respective costs for respective subgraphs, wherein a cost for a subgraph of a given type is defined by a cost function for the given type that takes at least the encrypted computation parameters for the given type as input and is independent from the instantiation parameters.

4. The method (900) of claim 1, wherein the encrypted computation parameters comprise one or more of: a decomposition base of a programmable bootstrapping, a decomposition level of a programmable bootstrapping, a decomposition base of a key switching, and a decomposition level of a key switching.

5. The method (900) of claim 1, wherein a subgraph of the multiple subgraphs comprises a programmable bootstrapping resulting in an output ciphertext, and a noise rounding of the output ciphertext.

6. The method (900) of claim 1, wherein the optimization of the encrypted computation parameters is performed by branch-and-bound.

7. The method (900) of claim 1, wherein the encrypted computation parameters identify respective key switching and/or bootstrapping keys to be used for respective subgraphs, wherein, if the noise constraint for the first subgraph is at least as strict as the noise constraint for the second subgraph, the key switching and/or bootstrapping key for the first subgraph is constrained to add at most as much noise as the key switching and/or bootstrapping key for the second subgraph.

8. The method (900) of claim 1, wherein the encrypted computation parameters indicate, for respective subgraphs in which respective linear maps are applied, a respective number of programmable bootstrappings to be performed during the application of the respective linear map.

9. The method (900) of claim 8, further comprising splitting the respective linear map into a number of respective linear maps corresponding to the number of programmable bootstrappings by minimizing a maximal 2-norm of the respective linear maps.

10. The method (900) of claim 8, wherein, if the noise constraint for the first subgraph is at least as strict as the noise constraint for the second subgraph, the number of programmable bootstrappings for the first subgraph is constrained to be greater than or equal to the number of programmable bootstrappings for the second subgraph.

11. The method (900) of claim 1, further comprising:
   transforming an unencrypted computation graph into the computation graph of the encrypted computation; and/or
   compiling the computation graph of the encrypted computation into a set of instructions for an encrypted computation engine; and/or
   carrying out the encrypted computation according to the determined encrypted computation parameters.

12. A transitory or non-transitory computer-readable storage medium (1000) comprising data (1020) representing instructions which, when executed by a processor system, cause the processor system to perform the method according to claim 1; and/or encrypted computation parameters and/or instructions for an encrypted computation engine determined.

13. A configuration device (110) for determining encrypted computation parameters for carrying out an encrypted computation on noisy ciphertexts, comprising:

a storage (130) for storing data representing a computation graph of the encrypted computation;

a processor subsystem (140) configured to:

obtain a division of the computation graph into multiple subgraphs, wherein a subgraph represents a subcomputation resulting in an output ciphertext with an input-independent noise, and is defined by a type from a set of one or more types, and by zero or more instantiation parameters for the type;

define respective sets of encrypted computation parameters for the respective types;

perform an optimization of the encrypted computation parameters, wherein: the encrypted computation parameters are optimized to minimize a computational cost of carrying out the encrypted computation according to the encrypted computation parameters; and the encrypted computation parameters are constrained to satisfy a noise constraint on ciphertext noise while carrying out the encrypted computation, wherein the noise constraint is based on respective noise constraints for respective subgraphs, wherein a noise constraint for a subgraph of a given type is defined by a noise constraint function for the given type that takes at least the encrypted computation parameters for the given type and the instantiation parameters of the subgraph as input, determining, based on the instantiation parameters of a first and second subgraph, that the noise constraint for the first subgraph is at least as strict as the noise constraint for the second subgraph; and eliminating the noise constraint for the second subgraph from the optimization.

* * * * *